United States Patent
Oota

(10) Patent No.: US 11,299,620 B2
(45) Date of Patent: Apr. 12, 2022

(54) EPOXY RESIN COMPOSITION, CURED PRODUCT, AND ELECTRICAL OR ELECTRONIC COMPONENT

(71) Applicant: Mitsubishi Chemical Corporation, Chiyoda-ku (JP)

(72) Inventor: Kazumasa Oota, Tokyo (JP)

(73) Assignee: Mitsubishi Chemical Corporation, Chiyoda-ku (JP)

( * ) Notice: Subject to any disclaimer, the term of this patent is extended or adjusted under 35 U.S.C. 154(b) by 120 days.

(21) Appl. No.: 16/897,421

(22) Filed: Jun. 10, 2020

(65) Prior Publication Data
US 2020/0299503 A1 Sep. 24, 2020

Related U.S. Application Data

(63) Continuation of application No. PCT/JP2018/045282, filed on Dec. 10, 2018.

(30) Foreign Application Priority Data

Dec. 12, 2017 (JP) ............................... JP2017-237870

(51) Int. Cl.
| | | |
|---|---|---|
| *C08L 63/02* | (2006.01) | |
| *C08G 59/38* | (2006.01) | |
| *C08G 59/42* | (2006.01) | |
| *C08G 59/44* | (2006.01) | |
| *C08G 59/50* | (2006.01) | |
| *C08G 59/62* | (2006.01) | |
| *C08L 63/00* | (2006.01) | |
| *C08G 59/06* | (2006.01) | |
| *C08G 59/24* | (2006.01) | |

(52) U.S. Cl.
CPC ............ *C08L 63/00* (2013.01); *C08G 59/063* (2013.01); *C08G 59/24* (2013.01); *C08G 59/38* (2013.01); *C08L 2203/20* (2013.01); *C08L 2205/025* (2013.01)

(58) Field of Classification Search
None
See application file for complete search history.

(56) References Cited

U.S. PATENT DOCUMENTS

| | | | | |
|---|---|---|---|---|
| 7,268,192 B2 * | 9/2007 | Asakage | ............... | C08G 59/245 525/523 |
| 2002/0123602 A1 | 9/2002 | Murata et al. | | |
| 2005/0131195 A1 | 6/2005 | Asakage et al. | | |
| 2018/0215862 A1 | 8/2018 | Oota | | |

FOREIGN PATENT DOCUMENTS

| | | |
|---|---|---|
| EP | 0 579 301 A2 | 1/1994 |
| JP | 58-39677 A | 3/1983 |
| JP | 4-175331 A | 6/1992 |
| JP | 6-9595 A | 1/1994 |
| JP | 10-147629 A | 6/1998 |
| JP | 11-349661 A | 12/1999 |
| JP | 2000-239346 A | 9/2000 |
| JP | 2002-201255 A | 7/2002 |
| JP | 2004-262977 A | 9/2004 |
| JP | 2007-238963 A | 9/2007 |
| JP | 2017-48387 A | 3/2017 |

OTHER PUBLICATIONS

International Search Report dated Feb. 19, 2019 in PCT/JP2018/045282 filed Dec. 10, 2018, 2 pages.

* cited by examiner

*Primary Examiner* — Michael J Feely
(74) *Attorney, Agent, or Firm* — Oblon, McClelland, Maier & Neustadt, L.L.P.

(57) ABSTRACT

The present invention relates to an epoxy resin composition (A) containing an epoxy resin represented by the following formula (1):

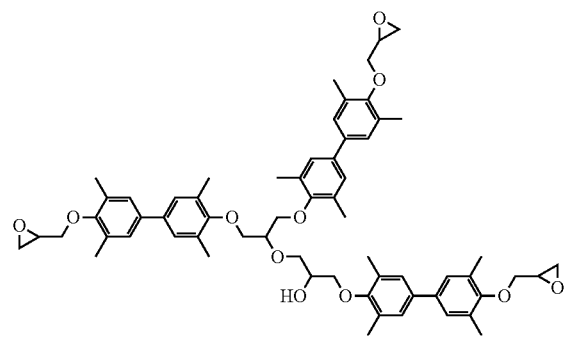

and an epoxy resin represented by the following formula (2):

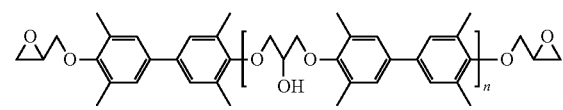

wherein in formula (2), n represents an integer of from 0 to 2,
wherein a content of the epoxy resin represented by formula (1) is from 0.01 to 0.99% by weight, and
relates to an epoxy resin composition (B) containing a curing agent in an amount of from 0.01 to 1000 parts by weight relative to 100 parts by weight of the epoxy resin composition (A).

17 Claims, 1 Drawing Sheet

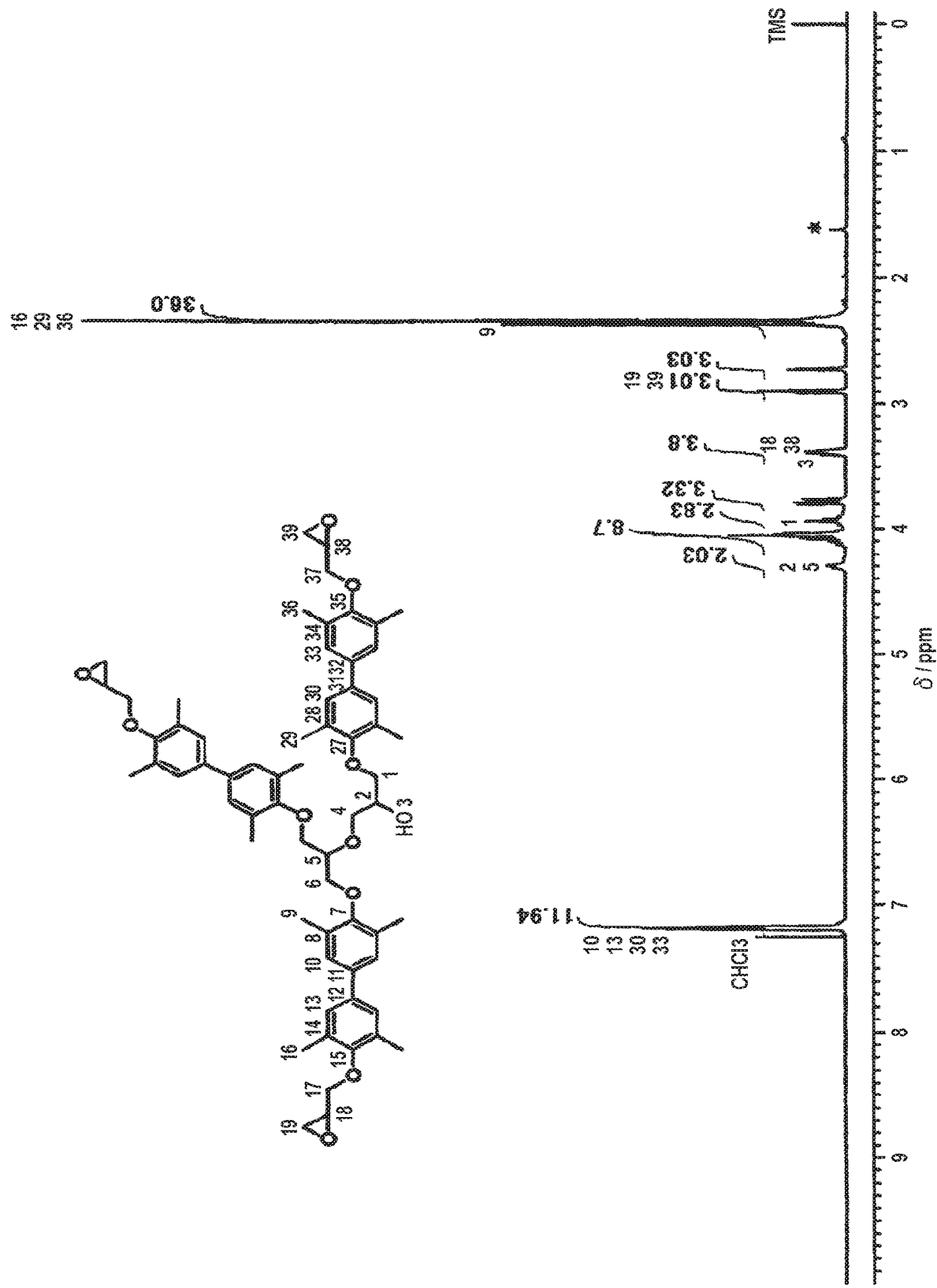

EPOXY RESIN COMPOSITION, CURED PRODUCT, AND ELECTRICAL OR ELECTRONIC COMPONENT

TECHNICAL FIELD

The present invention relates to an epoxy resin composition which has excellent handleability and curability and provides a cured product having excellent heat resistance, and a cured product obtained by curing the epoxy resin composition. The present invention also relates to an electrical or electronic component containing the cured product of the epoxy resin.

BACKGROUND ART

The epoxy resin generally provides a cured product excellent in mechanical property, heat resistance, electrical property, etc., by curing with various curing agents and therefore, is utilized in wide fields such as adhesives, paints, and electrical or electronic materials. Among others, in the field of electrical or electronic materials, a tetramethylbiphenol type epoxy resin is often used for the application to a semiconductor sealing material, since a sealing material with a high added value can be provided.

The tetramethylbiphenol type epoxy resin has excellent heat resistance and moisture absorption resistance due to its rigid tetramethylbiphenyl skeleton and since the melt viscosity at 150° C. is low, the resin not only enables high filling of a filler as a semiconductor sealing material but also is effective in preventing wire flowing at the time of molding of a sealing material for a semiconductor. On the other hand, this resin has the following drawbacks.

Namely, since the tetramethylbiphenol type epoxy resin is a bifunctional epoxy resin, a crosslinking density thereof is low, and a heat resistance thereof is insufficient for the application to an electric or electronic material. In addition, since the epoxy equivalent thereof is high, it is inferior in that an amount of secondary hydroxy groups generated after the curing reaction is large, and a moisture absorption rate is high. Further, an amount of hydrolyzable chlorine cannot be said to be at a sufficient level in the aspect of low chlorination required in recent years.

Patent Document 1 describes that a tetramethylbiphenol type epoxy resin is produced by reacting 4,4'-bishydroxy-3,3',5,5'-tetramethylbiphenyl with epichlorohydrin.

Patent Document 2 describes that a tetramethylbiphenol type epoxy resin is produced by reacting 4,4'-bishydroxy-3,3',5,5'-tetramethylbiphenyl with epichlorohydrin, and dimethyl sulfoxide is used as a co-catalyst for the reaction.

Patent Document 3 describes that an epoxy resin is obtained by adding a KOH or NaOH/isopropanol solution to a commercially available tetramethylbiphenol type epoxy resin ("EPIKOTE YX4000", epoxy equivalent: 186, content of entire organic halogen: 1,180 ppm) in a mixed solvent of isobutyl ketone and dimethyl sulfoxide and reacting the substances at 70° C. or 60° C.

Patent Document 4 discloses a method for producing a high-purity epoxy resin containing a specific polyfunctional epoxy resin by reacting an epoxy compound in a specific temperature range in the presence of an alkali metal hydroxide. Patent Document 4 describes that it is preferable to contain the specific polyfunctional epoxy resin in an amount of from 1% to 10%, and being less than 1% is not preferred from the viewpoint of heat resistance.

Patent Document 5 describes a crystalline epoxy resin showing a specific GPC analysis peak obtained by reacting 4,4'-bishydroxy-3,3',5,5'-tetramethylbiphenyl with epichlorohydrin.

Patent Document 6 describes a tetramethylbiphenol type epoxy resin having a specific molecular weight and a low hydrolyzable chlorine content, which is produced by reacting 4,4'-bishydroxy-3,3',5,5'-tetramethylbiphenyl with epichlorohydrin.

BACKGROUND ART DOCUMENT

Patent Document

Patent Document 1: JP-A-S58-039677
Patent Document 2: JP-A-H10-147629
Patent Document 3: JP-A-2000-239346
Patent Document 4: JP-A-2004-262977
Patent Document 5: JP-A-H04-175331
Patent Document 6: JP-A-2017-048387

SUMMARY OF INVENTION

Technical Problem

However, it can be confirmed from Comparative Examples described later that the epoxy resins of the present invention are not produced by the production methods described in Patent Documents 1 to 5.

It is confirmed that the epoxy resin described in Patent Document 6 has insufficient handleability, curability, and heat resistance.

An object of the present invention is to provide an epoxy resin composition (A) which has excellent handleability as an epoxy resin, an epoxy resin composition (B) which has excellent curability by containing the epoxy resin composition (A) and a curing agent and can provide a cured product having excellent heat resistance, and a cured product thereof. Another object of the present invention is to provide an electric or electronic component containing the cured product of the epoxy resin.

Solution to Problem

The inventor of the present invention has made intensive studies in order to solve the above problem. As a result, it has been found that an epoxy resin composition (A) containing a specific amount of an epoxy resin having a specific structure and an epoxy resin composition (B) containing the epoxy resin composition (A) and a curing agent can solve the above problem. Thus, the present invention has been accomplished.

Namely, the gist of the present invention resides in the following [1] to [8].

[1] An epoxy resin composition (A), containing
an epoxy resin represented by the following formula (1):

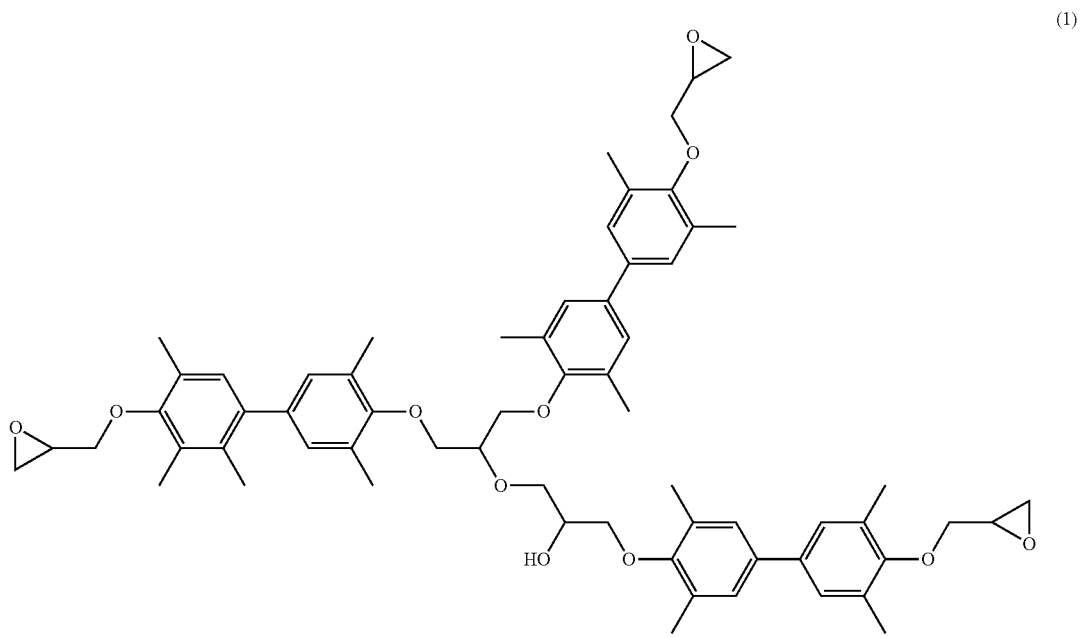 [SMILES: Cc1cc(-c2cc(C)c(OCC3CO3)c(C)c2)cc(C)c1OCC(O)COC(COc1c(C)cc(-c2cc(C)c(OCC3CO3)c(C)c2)cc1C)COc1c(C)cc(-c2cc(C)c(OCC3CO3)c(C)c2C)cc1C]

and
an epoxy resin represented by the following formula (2):

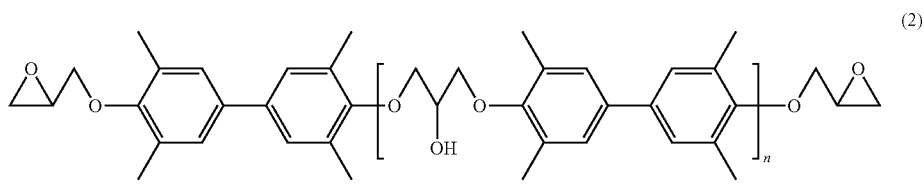

wherein in formula (2), n represents an integer of from 0 to 2, wherein a content of the epoxy resin represented by formula (1) is from 0.01 to 0.99% by weight.

[2] The epoxy resin composition (A) according to [1], wherein among the epoxy resin represented by formula (2),
an epoxy resin in which n=0 is contained in an amount of from 49.2 to 89.0% by weight,
an epoxy resin in which n=1 is contained in an amount of from 8.2 to 39.2% by weight, and
an epoxy resin in which n=2 is contained in an amount of from 0.1 to 7.5% by weight.

[3] The epoxy resin composition (A) according to [2], wherein among the epoxy resin represented by formula (2),
the epoxy resin in which n=0 is contained in an amount of from 51.9 to 87.9% by weight,
the epoxy resin in which n=1 is contained in an amount of from 8.9 to 37.4% by weight, and
the epoxy resin in which n=2 is contained in an amount of from 0.2 to 7.1% by weight.

[4] An epoxy resin composition (B), containing a curing agent in an amount of from 0.01 to 1000 parts by weight relative to 100 parts by weight of the epoxy resin composition (A) according to any one of [1] to [3].

[5] The epoxy resin composition (B) according to [4], wherein the curing agent is at least one selected from the group consisting of a phenolic curing agent, an amine curing agent, an acid anhydride curing agent, and an amide curing agent.

[6] The epoxy resin composition (B) according to [4] or [5], further containing an epoxy resin which is different from the epoxy resin in the epoxy resin composition (A).

[7] A cured product obtained by curing the epoxy resin composition (B) according to any one of [4] to [6].

[8] An electrical or electronic component obtained by curing the epoxy resin composition (B) according to any one of [4] to [6].

Advantageous Effects of Invention

According to the present invention, an epoxy resin composition (A) having excellent handleability, in comparison with conventional products, an epoxy resin composition (B) having excellent curability, and a cured product of an epoxy resin which has excellent heat resistance are provided.

Since the cured product of the epoxy resin of the present invention has the above effects, it can be particularly effectively applied to electrical or electronic components such as semiconductor sealing materials and laminates.

BRIEF DESCRIPTION OF DRAWINGS

FIG. 1 is a $^1$H-NMR spectrum chart of an epoxy resin (1) in an epoxy resin composition obtained in Example 1.

DESCRIPTION OF EMBODIMENTS

Hereinafter, although embodiments of the present invention will be described in detail, the following description is an example of the embodiments of the present invention, and the present invention is not limited to the following description, unless the gist of the present invention is exceeded. In the present description, the expression "to" is used as an expression including numerical values or physical property values before and after the expression.

[Epoxy Resin Composition (A)]

An epoxy resin composition (A) of the present invention contains an epoxy resin represented by the following formula (1) (hereinafter, which may be referred to as an "epoxy resin (1)") and an epoxy resin represented by the following formula (2), and a content of the epoxy resin (1) is from 0.01 to 0.99% by weight.

It is preferable that the epoxy resin composition (A) of the present invention contains, among the epoxy resin represented by the following formula (2), an epoxy resin in which n=0 (hereinafter, which may be referred to as an "epoxy resin (2-0)") in an amount of from 49.2 to 89.0% by weight, particularly from 51.9 to 87.9% by weight, an epoxy resin in which n=1 (hereinafter, which may be referred to as an "epoxy resin (2-1)") in an amount of from 8.2 to 39.2% by weight, particularly from 8.9 to 37.4% by weight, and an epoxy resin in which n=2 (hereinafter, which may be referred to as an "epoxy resin (2-2)") in an amount of from 0.1 to 7.5% by weight, and particularly from 0.2 to 7.1% by weight.

Hereinafter, the epoxy resin (2-0), the epoxy resin (2-1), and the epoxy resin (2-2) are collectively referred to as "epoxy resin (2)".

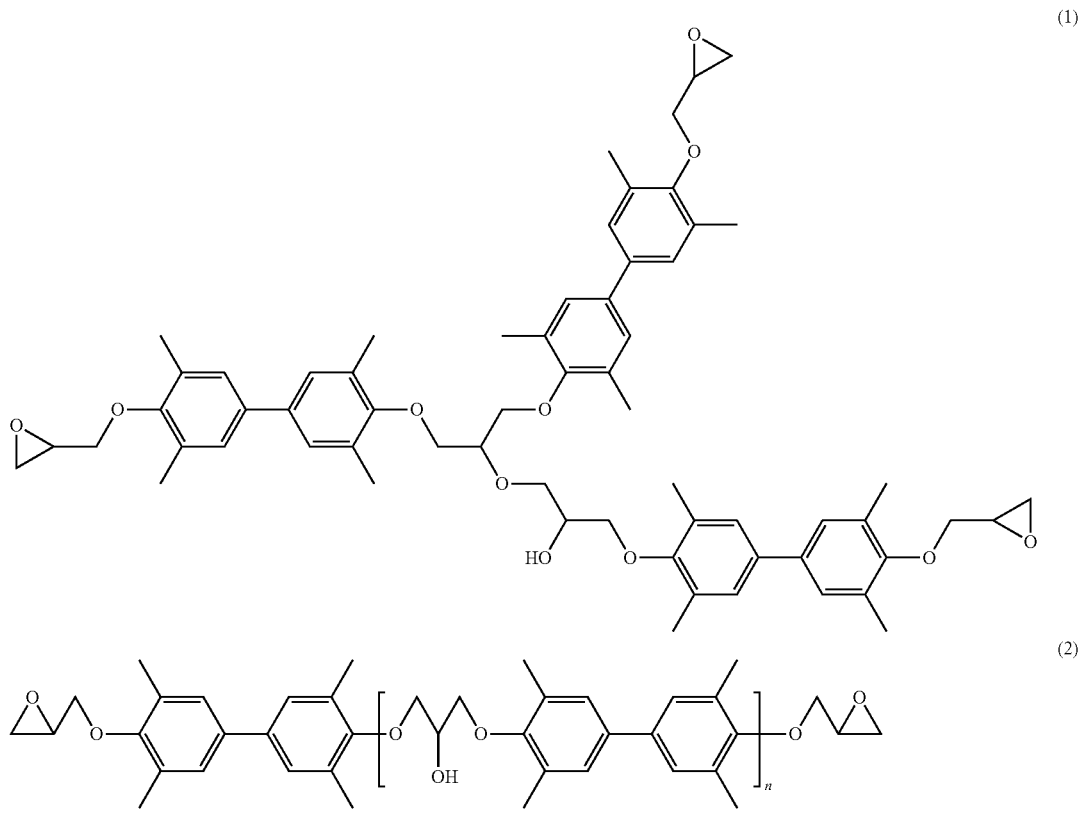

(In formula (2), n represents an integer of from 0 to 2.)

The epoxy resin composition (A) of the present invention is defined as an "epoxy resin composition" because of containing a plurality of components such as the epoxy resin (1) and the epoxy resin (2). However, in the technical field of an epoxy resin, an "epoxy resin" is not composed of a single component but is obtained as a "composition" composed of multiple components. Therefore, the epoxy resin composition (A) of the present invention is expressed in the art as an "epoxy resin", and is sometimes sold as an "epoxy resin". In the art, an "epoxy compound (uncured)" is referred to as an "epoxy resin".

[Mechanism]

The epoxy resin composition (A) of the present invention containing the epoxy resin (1) having a radiated structure at a specific ratio relative to the epoxy resin (2) having a linear structure becomes a solid after 24 hours in an environment of from 0° C. to 30° C. from a molten state at 150° C. due to the epoxy resin (1) contained at a specific ratio. In addition, the epoxy resin composition (A) of the present invention has a melting temperature of 100° C. or lower, has an excellent handleability and additionally has excellent curing characteristics in the case of being included in an epoxy resin composition (B) containing a curing agent, and thus provides a cured product having an excellent heat resistance.

[Epoxy Resin (1), Epoxy Resin (2), and Other Components]

The epoxy resin composition (A) of the present invention needs to contain the epoxy resin (1) in an amount of 0.01% by weight or more and 0.99% by weight or less from viewpoints of obtaining the excellent handleability, the excellent curability as the epoxy resin composition (B) containing a curing agent to be described below, and the excellent heat resistance as a cured product thereof, and preferably contains the epoxy resin (1) in an amount of 0.1% by weight or more and 0.9% by weight or less, and more preferably in an amount of 0.3% by weight or more and 0.7% by weight or less from a viewpoint of enhancing the above characteristics. When the content of the epoxy resin (1) is smaller than or larger than the above upper limit, the handleability, the curability and the heat resistance are insufficient.

In addition, it is preferable that the epoxy resin composition (A) of the present invention contains the epoxy resin (2-0) in an amount of 49.2% by weight or more and 89.0% by weight or less, the epoxy resin (2-1) in an amount of 8.2% by weight or more and 39.2% by weight or less, and the epoxy resin (2-2) in an amount of 0.1% by weight or more and 7.5% by weight or less. As for the contents of these epoxy resins (2), it is more preferable that the epoxy resin (2-0) is in an amount of 51.9% by weight or more and 87.9% by weight or less, the epoxy resin (2-1) is in an amount of 8.9% by weight or more and 37.4% by weight or less, and the epoxy resin (2-2) is in an amount of 0.2% by weight or more and 7.1% by weight or less; and it is particularly preferable that the epoxy resin (2-0) is in an amount of 55.2% by weight or more and 80.3% by weight or less, the epoxy resin (2-1) is in an amount of 14.8% by weight or more and 35.2% by weight or less, and the epoxy resin (2-2) is in an amount of 1.4% by weight or more and 6.3% by weight or less. It is more preferable that the total content of the components (the epoxy resin (2-0), the epoxy resin (2-1), and the epoxy resin (2-2)) of the epoxy resin (2) in the epoxy resin composition (A) of the present invention is 96.4% by weight or more and 97.3% by weight or less, particularly 96.4% by weight or more and 97.0% by weight or less, and especially 96.5% by weight or more and 97.0% by weight or less.

When the content of each epoxy resin (2) is within the above range, the effects of the present invention that the handleability is excellent and additionally, the curing characteristics is excellent in the case of being included in the epoxy resin composition (B) containing a curing agent, and a cured product having the excellent heat resistance is provided can be obtained more reliably.

The epoxy resin composition (A) of the present invention preferably contains other components (hereinafter, simply referred to as "other components") in addition to the epoxy resin (1) and the epoxy resin (2). The content of the other components is preferably 3.0% by weight or less, and the total of the components is preferably 100% by weight.

The other components refer to an epoxy resin in which n is 3 or more in formula (2), a component which is difficult to identify (a component that cannot be analyzed) and a chlorine-containing organic component which are by-produced in a reaction process, in which the other components are produced in the process of producing the epoxy resin composition (A) of the present invention. The content of the other components in the epoxy resin composition (A) of the present invention is preferably 3% by weight or less, more preferably 2.8% by weight or less, and still more preferably 2.6% by weight or less. When the content of the other components is too large, the required contents of the epoxy resin (1) and the epoxy resin (2) cannot be ensured, and the effects of improving the handleability, the curability, and the heat resistance cannot be sufficiently obtained.

In the epoxy resin composition (A) of the present invention, a total amount of the above epoxy resin (1) and epoxy resin (2) and other components is 100% by weight. A content of each component of the epoxy resin composition (A) of the present invention can be measured by high performance liquid chromatography analysis (hereinafter, LC analysis).

[Epoxy Equivalent]

The epoxy resin composition (A) preferably has an epoxy equivalent of from 191 to 320 g/equivalent from the viewpoints of obtaining the excellent handleability as an epoxy resin, the excellent curability as the epoxy resin composition (B) containing a curing agent, and the excellent heat resistance as a cured product thereof, and more preferably has an epoxy equivalent of from 191 to 236 g/equivalent from the viewpoint of further improving the handleability. When the epoxy equivalent is within the above specific ranges, it is considered that the above excellent characteristics can be obtained.

The "epoxy equivalent" as used in the present invention is defined as "the mass of the epoxy resin containing one equivalent of an epoxy group" and can be measured in conformity with JIS K7236.

[Method for Producing Epoxy Resin Composition (A)]

The method for producing the epoxy resin composition (A) of the present invention is not particularly limited. For example, the epoxy resin composition (A) can be produced by producing a tetramethylbiphenol type epoxy resin (hereinafter, which may be referred to as a "crude epoxy resin") by a specific method, and then reacting the tetramethylbiphenol type epoxy resin with an alkali metal hydroxide.

[Production of Crude Epoxy Resin]

The method of producing the crude epoxy resin is not particularly limited. For example, a production method by a one-step process described below and the like can be mentioned.

<Production Method by One-Step Process>

In the production method by a one-step process, 4,4'-bishydroxy-3,3',5,5'-tetramethylbiphenyl (hereinafter, which may be referred to as "tetramethylbiphenol (3)") represented by the following formula is reacted with epihalohydrin to produce the crude epoxy resin as a raw material of the epoxy resin of the present invention.

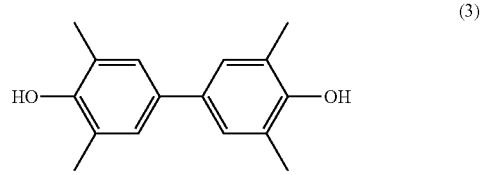 [SMILES: Cc1cc(-c2cc(C)c(O)c(C)c2)cc(C)c1O]

(3)

In the case of producing the crude epoxy resin by the one-step process, although at least the tetramethylbiphenol (3) and the epihalohydrin are used as raw materials, the crude epoxy resin may be produced as a mixture of the epoxy resin (1), the epoxy resin (2), and an other epoxy resin by using, in combination, a polyvalent hydroxy compound other than the tetramethylbiphenol (3) (hereinafter, the compound may be referred to as an "other polyvalent hydroxy compound").

However, from the viewpoint of enhancing the effects of the present invention, the proportion of tetramethylbiphenol (3) is preferably 80 mol % or more, more preferably 90 mol % or more, and still more preferably 95 mol % or more, relative to a total amount of the polyvalent hydroxy compounds used as the raw material. The upper limit thereof is 100 mol %, and 100 mol % is particularly preferable.

The "polyvalent hydroxy compound" as used in the present invention is a generic term of a divalent or higher-valent phenol compound and a dihydric or higher-hydric alcohol.

Examples of the other polyvalent hydroxy compound include various polyvalent phenols (excluding tetramethylbiphenol (3)) such as bisphenol A, bisphenol F, bisphenol S, bisphenol AD, bisphenol AF, hydroquinone, resorcin, methyl resorcin, biphenol, dihydroxynaphthalene, dihydroxydiphenyl ether, thiodiphenols, phenol novolak resin, cresol novolak resin, phenol aralkyl resin, biphenyl aralkyl resin, naphthol aralkyl resin, terpene phenolic resin, dicyclopentadiene phenolic resin, bisphenol A novolak resin, naphthol novolak resin, brominated bisphenol A and brominated phenol novolak resin; polyvalent phenolic resins obtained by a condensation reaction of various phenols with various aldehydes such as benzaldehyde, hydroxybenzaldehyde, crotonaldehyde and glyoxal; polyvalent phenolic resins obtained by a condensation reaction of a xylene resin with phenols; various phenolic resins such as co-condensed resin of heavy oil or pitches with phenols and formaldehydes; chain aliphatic diols such as ethylene glycol, trimethylene glycol, propylene glycol, 1,3-butanediol, 1,4-butanediol, 1,3-pentanediol, 1,4-pentanediol, 1,5-pentanediol and 1,6-hexanediol; cyclic aliphatic diols such as cyclohexanediol and cyclodecanediol; and polyalkylene ether glycols such as polyethylene ether glycol, polyoxytrimethylene ether glycol and polypropylene ether glycol.

Among these, preferred are, for example, a phenol novolak resin, a phenol aralkyl resin, a polyvalent phenol resin obtained by a condensation reaction of phenol with hydroxybenzaldehyde, a biphenyl aralkyl resin, a naphthol aralkyl resin, chain aliphatic diols such as ethylene glycol, trimethylene glycol, propylene glycol, 1,3-butanediol, 1,4-butanediol, 1,3-pentanediol, 1,4-pentanediol, 1,5-pentanediol and 1,6-hexanediol, cyclic aliphatic diols such as cyclohexanediol and cyclodecanediol, and polyalkylene ether glycols such as polyethylene ether glycol, polyoxytrimethylene ether glycol and polypropylene ether glycol.

The tetramethylbiphenol (3) used as the raw material and other polyvalent hydroxy compound used, if desired, are dissolved in epihalohydrin of an amount corresponding to generally from 1.0 to 10.0 equivalents, preferably from 2.9 to 5.9 equivalents, and more preferably from 3.0 to 5.0 equivalents, per equivalent of the hydroxy group in the entire polyvalent hydroxy compound, i.e., the total of these polyvalent hydroxy compounds, to make a uniform solution. The amount of the epihalohydrin is preferably larger than or equal to the lower limit described above, since the reaction for increasing the molecular weight can be easily controlled and the obtained epoxy resin can have an appropriate epoxy equivalent. On the other hand, the amount of epihalohydrin is preferably smaller than or equal to the upper limit described above, since the production efficiency tends to be enhanced.

As the epihalohydrin in this reaction, epichlorohydrin or epibromohydrin is generally used.

Subsequently, with stirring the solution, an alkali metal hydroxide in an amount corresponding to generally from 0.5 to 2.0 equivalents, preferably from 0.7 to 1.8 equivalents, and more preferably from 0.9 to 1.6 equivalents, per equivalent of the hydroxy group in the entire polyvalent hydroxy compound as the raw material is added in the form of a solid or an aqueous solution and reacted. The amount of the alkali metal hydroxide is preferably larger than or equal to the lower limit described above, since an unreacted hydroxy group is less likely to react with the produced epoxy resin, which facilitates control of the reaction for increasing the molecular weight. In addition, the amount of an alkali metal hydroxide is preferably smaller than or equal to the upper limit value described above, since an impurity from a side reaction is less likely to be produced. The alkali metal hydroxide used here is generally sodium hydroxide or potassium hydroxide.

The reaction above can be performed under normal pressure or reduced pressure, and the reaction temperature is preferably from 20° C. to 150° C., more preferably from 40° C. to 100° C., and still more preferably from 40° C. to 80° C. A reaction temperature higher than or equal to the lower limit described above is preferred, since the reaction is readily allowed to proceed and at the same time, the reaction is easily controlled. In addition, a reaction temperature lower than or equal to the upper limit described above is preferred, since a side reaction is less likely to proceed and it is easy to reduce, among others, a chlorine impurity.

The reaction is performed with dehydrating water by a method of azeotrope of the reaction solution with keeping a predetermined temperature as needed, subjecting a condensate obtained by cooling volatilized vapor to oil/water separation, and returning oil after removal of water to a reaction system. The alkali metal hydroxide is added intermittently or continuously little by little preferably over 0.1 to 8 hours, more preferably over 0.1 to 7 hours, and still more preferably over 0.5 to 6 hours, so as to prevent a rapid reaction. The time spent during adding the alkali metal hydroxide is preferably longer than or equal to the lower limit described above, since the reaction can be prevented from rapidly proceeding and control of the reaction temperature is facilitated. The addition time is preferably shorter than or equal to the upper limit described above, since a chlorine impurity is less likely to be produced, and this is also preferred from the viewpoint of profitability. After the completion of the reaction, an insoluble byproduct salt is removed by filtration or removed by water washing, and unreacted epihalohydrin is then removed by distillation under reduced pressure, and as a result, the target crude epoxy resin can be obtained.

In addition, in the reaction above, a catalyst, for example, quaternary ammonium salts such as tetramethylammonium chloride and tetraethylammonium bromide, tertiary amines such as benzyldimethylamine and 2,4,6-tris(dimethylaminomethyl)phenol, imidazoles such as 2-ethyl-4-methylimidazole and 2-phenylimidazole, phosphonium salts such as ethyltriphenylphosphonium iodide, and phosphines such as triphenylphosphine, may also be used.

Furthermore, in the reaction above, an inert organic solvent, for example, alcohols such as ethanol and isopropanol, ketones such as acetone, methyl ethyl ketone and methyl isobutyl ketone, ethers such as dioxane and ethylene glycol dimethyl ether, glycol ethers such as methoxypropanol, and an aprotic polar solvent such as dimethylsulfoxide and dimethylformamide, may also be used.

[Production of Epoxy Resin Composition (A)]

When the crude epoxy resin produced as above is reacted with a strong alkali, the epoxy resin composition (A) of the present invention containing the epoxy resin (1), the epoxy resin (2) and other components at the above contents can be obtained. In addition, with the reaction with the strong alkali, the epoxy equivalent can be adjusted to a suitable range specified in the present invention.

Namely, for example, the epoxy equivalent can be increased by increasing the temperature, the resin content with respect to the solvent, and the alkali amount. Conversely, the epoxy equivalent can be reduced by lowering the temperature, and reducing the resin content with respect to the solvent, and the alkali amount.

Although detailed conditions for producing the epoxy resin composition (A) of the present invention are described below, since the reaction time is longer or shorter depending on the conditions, a desired epoxy resin composition (A) can be obtained by appropriately taking a sample, and analyzing the amount of each component and the epoxy equivalent.

In the reaction of the crude epoxy resin with a strong alkali, an organic solvent for dissolving the epoxy resin may be used. Although the organic solvent used for the reaction is not particularly limited, in view of production efficiency, handleability, workability, etc., a mixed solvent of an aprotic polar solvent and an inert organic solvent except for an aprotic polar solvent is preferred.

Examples of the aprotic polar solvent include dimethylsulfoxide, diethylsulfoxide, dimethylsulfone, sulfolane, dimethylformamide, dimethylacetamide, and hexamethylphosphoramide. One of these may be used alone, or two or more thereof may be mixed and used. Among these aprotic polar solvents, dimethylsulfoxide is preferred because of its availability and excellent effect.

Examples of the organic solvent for use with the aprotic polar solvent include ketone solvents such as methyl ethyl ketone, methyl isobutyl ketone, and cyclohexanone. Ketone solvents are preferred, and methyl isobutyl ketone is particularly preferred from the viewpoints of effects and ease of post-treatment. One of these may be used alone, or two or more thereof may be mixed and used.

The aprotic polar solvent and other organic solvent are preferably used such that the proportion of the aprotic polar solvent is from 1 to 30% by weight, and particularly from 10 to 20% by weight, relative to the total amount of these solvents.

The amount of the organic solvent is generally such an amount that the concentration of the crude epoxy resin is from 3 to 70% by weight, preferably from 5 to 50% by weight, and more preferably from 10 to 40% by weight.

As the strong alkali, a solution of an alkali metal hydroxide is used. Examples of the alkali metal hydroxide include potassium hydroxide and sodium hydroxide.

As the alkali metal hydroxide, one dissolved in an organic solvent is used.

The amount of the alkali metal hydroxide to be used is, in terms of the solid content of the alkali metal hydroxide, preferably 0.01 part by weight or more and 0.49 part by weight or less, relative to 100 parts by weight of the crude epoxy resin. When the amount of the alkali metal hydroxide to be used is within the above range, it is possible to easily adjust the respective component ratios of the obtained epoxy resin, and further, the epoxy equivalent within the preferred range described above. When the amount of the alkali metal hydroxide to be used is out of the above range, an epoxy resin containing the epoxy resin (1), the epoxy resin (2) and other components may not be obtained within the range specified in the present invention.

The reaction temperature is preferably from 70° C. to 90° C., and more preferably from 75° C. to 85° C., and the reaction time is preferably from 0.1 to 15 hours, and more preferably from 0.3 to 12 hours. When the reaction temperature is out of the above range, an epoxy resin containing the epoxy resin (1), the epoxy resin (2) and other components may not be obtained within the range specified in the present invention.

After the reaction, an excess alkali metal hydroxide or a byproduct salt is removed by water washing or other methods, and the organic solvent is removed by distillation under reduced pressure and/or steam distillation. As a result, the epoxy resin composition (A) of the present invention can be obtained.

[Epoxy Resin Composition (B)]

The epoxy resin composition (B) of the present invention contains at least the above epoxy resin composition (A) of the present invention and a curing agent. In addition, the epoxy resin composition (B) of the present invention can appropriately contain an epoxy resin other than the epoxy resin composition (A) of the present invention (hereinafter, which may be simply referred to as "other epoxy resin"), a curing accelerator, an inorganic filler, a coupling agent, or the like, if desired.

The epoxy resin composition (B) of the present invention containing the epoxy resin composition (A) of the present invention has excellent curing characteristics such as curability, and provides a cured product which sufficiently satisfies various physical properties required for various uses. With the epoxy resin composition (B) of the present invention having excellent curability, an improvement in productivity can be realized in application to various uses.

[Curing Agent]

The curing agent as used in the present invention indicates a substance contributing to a crosslinking reaction between epoxy groups and/or a chain extension reaction of the epoxy resin. In the present invention, generally, even what is called a "curing accelerator" is regarded as a curing agent if it is a substance contributing to the crosslinking reaction between epoxy groups and/or the chain extension reaction of the epoxy resin.

In the epoxy resin composition (B) of the present invention, a content of the curing agent is, as a solid content, preferably from 0.1 to 1,000 parts by weight relative to 100 parts by weight of the entire epoxy resin components. In addition, the content is more preferably 500 parts by weight or less, and still more preferably 300 parts by weight or less. The "solid content" as used in the present invention means components excluding the solvent and includes not only a solid epoxy resin but also a semi-solid or viscous liquid material. In addition, the "entire epoxy resin components" correspond to the amount of the epoxy resin contained in the epoxy resin composition (B) of the present invention, correspond to the amount of the epoxy resin (the epoxy resin (1), the epoxy resin (2), and the epoxy resin other than the epoxy resin (1) and the epoxy resin (2) in other components) in the epoxy resin composition (A) when the epoxy resin composition (B) of the present invention contains only the epoxy resin composition (A), and correspond to the total amount of the epoxy resin in the epoxy resin composition (A) and other epoxy resin when the epoxy resin composition (B) of the present invention contains the epoxy resin composition (A) and other epoxy resin.

The curing agent is not particularly limited, and all of those known in general as an epoxy resin-curing agent can be used. Examples thereof include a phenolic curing agent, an amine curing agent such as aliphatic amine, polyether amine, alicyclic amine and aromatic amine, an acid anhydride curing agent, an amide curing agent, tertiary amine, and imidazoles.

Among these, a phenolic curing agent is preferably contained as the curing agent, since the epoxy resin composition (B) of the present invention can be excellent in heat resistance, stress resistance, moisture absorption resistance, flame retardancy, etc., by containing a phenolic curing agent. In addition, from the viewpoint of heat resistance, etc., it is preferable to contain an acid anhydride curing agent or an amide curing agent. Further, use of imidazoles is also preferred from the viewpoint of allowing the curing reaction to sufficiently proceed and enhancing the heat resistance.

One of these curing agents may be used alone, or two or more thereof may be used in combination. In the case of using two or more kinds of curing agents in combination, the curing agents may be previously mixed to prepare a mixed curing agent and then used, or respective components of the curing agent may be separately added at the time of mixing respective components of the epoxy resin composition (B) and mixed simultaneously.

<Phenolic Curing Agent>

Specific examples of the phenolic curing agent include various polyvalent phenols such as bisphenol A, bisphenol F, bisphenol S, bisphenol AD, hydroquinone, resorcin, methyl resorcin, biphenol, tetramethylbiphenol, dihydroxynaphthalene, dihydroxydiphenyl ether, thiodiphenols, phenol novolak resin, cresol novolak resin, phenol aralkyl resin, biphenyl aralkyl resin, naphthol aralkyl resin, terpene phenol resin, dicyclopentadiene phenol resin, bisphenol A novolak resin, trisphenolmethane type resin, naphthol novolak resin, brominated bisphenol A and brominated phenol novolak resin; polyvalent phenolic resins obtained by a condensation reaction of various phenols with various aldehydes such as benzaldehyde, hydroxybenzaldehyde, crotonaldehyde and glyoxal; polyvalent phenol resins obtained by a condensation reaction of a xylene resin with phenols; a co-condensed resin of heavy oil or pitches with phenols and formaldehydes; and various phenol resins such as phenol-benzaldehyde-xylylene dimethoxide polycondensate, phenol-benzaldehyde-xylylene dihalide polycondensate, phenol-benzaldehyde-4,4'-dimethoxide biphenyl polycondensate and phenol-benzaldehyde-4,4'-dihalide biphenyl polycondensate.

Only one of these phenolic curing agents may be used, or two or more thereof may be combined and used in any combination in an optional blending ratio.

Among these phenolic curing agents, from the viewpoint of heat resistance, curability, etc., after curing of the composition, preferred agents are a phenol novolak resin (for example, a compound represented by the following formula (4)), a phenol aralkyl resin (for example, a compound represented by the following formula (5)), a biphenyl aralkyl resin (for example, a compound represented by the following formula (6)), a naphthol novolak resin (for example, a compound represented by the following formula (7)), a naphthol aralkyl resin (for example, a compound represented by the following formula (8)), a trisphenol methane type resin (for example, a compound represented by the following formula (9)), a phenol-benzaldehyde-xylylene dimethoxide polycondensate (for example, a compound represented by the following formula (10)), a phenol-benzaldehyde-xylylene dihalide polycondensate (for example, a compound represented by the following formula (10)), a phenol-benzaldehyde-4,4'-dimethoxide biphenyl polycondensate (for example, a compound represented by the following formula (11)), a phenol-benzaldehyde-4,4'-dihalidebiphenyl polycondensate (for example, a compound represented by the following formula (11)), and the like. Particularly preferred agents are a phenol novolak resin (for example, a compound represented by the following formula (4)), a phenol aralkyl resin (for example, a compound represented by the following formula (5)), a biphenyl aralkyl resin (for example, a compound represented by the following formula (6)), a phenol-benzaldehyde-xylylene dimethoxide polycondensate (for example, a compound represented by the following formula (10)), a phenol-benzaldehyde-xylylene dihalide polycondensate (for example, a compound represented by the following formula (10)), a phenol-benzaldehyde-4,4'-dimethoxide biphenyl polycondensate (for example, a compound represented by the following formula (11)), a phenol-benzaldehyde-4,4'-dihalidebiphenyl polycondensate (for example, a compound represented by the following formula (11)), and the like.

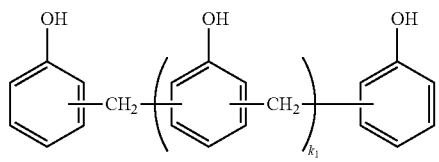

(4)

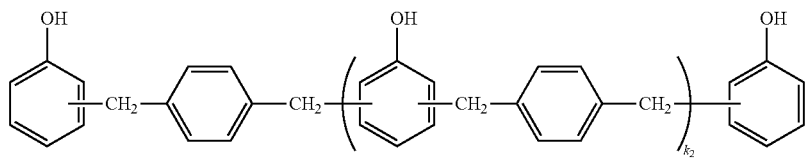

(5)

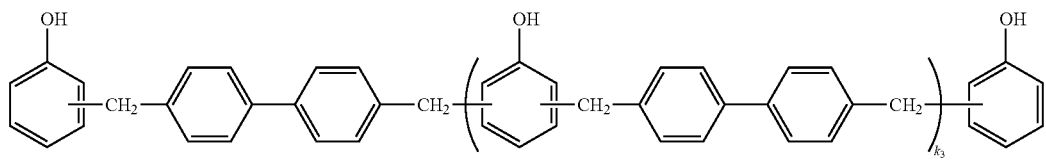

(6)

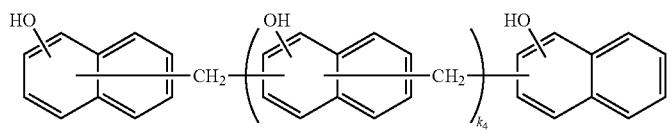

(7)

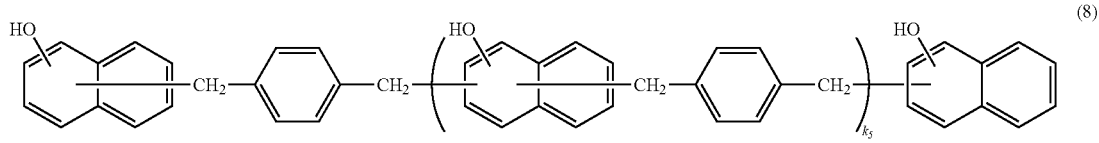

(8)

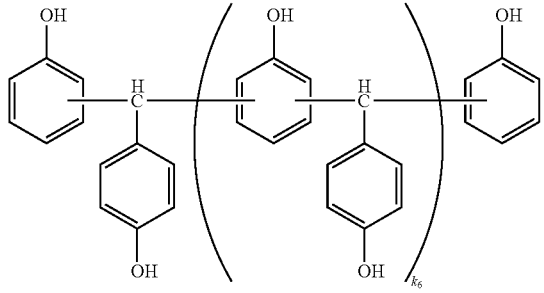

(9)

(In the above formulae (4) to (9), each of $k_1$ to $k_6$ represents a number of 0 or more.)

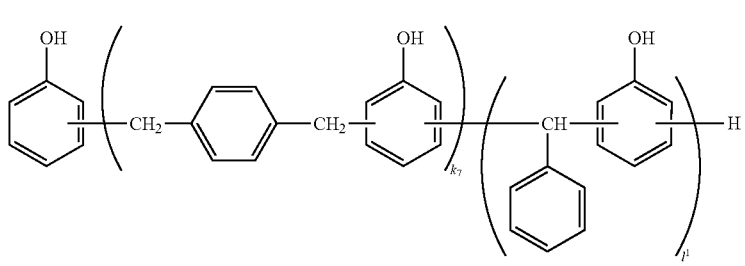

(10)

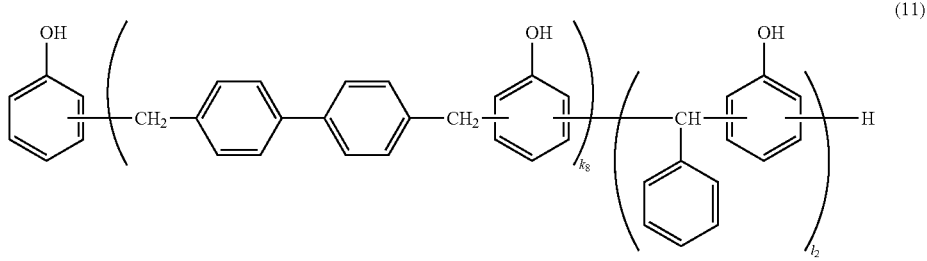

(11)

(In the above formulae (10) and (11), each of $k_7$, $k_8$, $l_1$, and $l_2$ represents a number of 1 or more.)

The blending amount of the phenolic curing agent is preferably from 0.1 to 1,000 parts by weight, more preferably 500 parts by weight or less, still more preferably 300 parts by weight or less, and particularly preferably 100 parts by weight or less, relative to 100 parts by weight of the entire epoxy resin components in the epoxy resin composition (B).

<Amine Curing Agent>

Examples of the amine curing agent (excluding tertiary amine) include aliphatic amines, polyether amines, alicyclic amines, and aromatic amines.

Examples of the aliphatic amines include ethylenediamine, 1,3-diaminopropane, 1,4-diaminopropane, hexamethylenediamine, 2,5-dimethylhexamethylenediamine, trimethylhexamethylenediamine, diethylenetriamine, iminobispropylamine, bis(hexamethylene)triamine, triethylenetetramine, tetraethylenepentamine, pentaethylenehexamine, N-hydroxyethylethylenediamine, and tetra(hydroxyethyl)ethylenediamine.

Examples of the polyether amines include triethylene glycol diamine, tetraethylene glycol diamine, diethylene glycol bis(propylamine), polyoxypropylenediamine, and polyoxypropylenetriamines.

Examples of the alicyclic amines include isophorone diamine, methacene diamine, N-aminoethylpiperazine, bis (4-amino-3-methyldicyclohexyl)methane, bis(aminomethyl)cyclohexane, 3,9-bis(3-aminopropyl)-2,4,8,10-tetraoxaspiro(5,5)undecane, and norbornene diamine.

Examples of the aromatic amines include tetrachloro-p-xylenediamine, m-xylenediamine, p-xylenediamine, m-phenylenediamine, o-phenylenediamine, p-phenylenediamine, 2,4-diaminoanisole, 2,4-toluenediamine, 2,4-diaminodiphenylmethane, 4,4'-diaminodiphenylmethane, 4,4'-diamino-1,2-diphenylethane, 2,4-diaminodiphenylsulfone, 4,4'-diaminodiphenylsulfone, m-aminophenol, m-aminobenzylamine, benzyldimethylamine, 2-(dimethylaminomethyl)phenol, triethanolamine, methylbenzylamine, α-(m-aminophenyl)ethylamine, α-(p-aminophenyl)ethylamine, diaminodiethyldimethyldiphenylmethane, and α,α'-bis(4-aminophenyl)-p-diisopropylbenzene.

Only one of these amine curing agents may be used, or two or more thereof may be combined and used in any combination in an optional blending ratio.

The amine curing agent above is preferably used in an amount ranging from 0.8 to 1.5 in terms of equivalent ratio of a functional group in the curing agent to an epoxy group in entire epoxy resin components contained in the epoxy resin composition (B). The amount within this range is preferred, since an unreacted epoxy group or a functional group of the curing agent is less likely to remain.

Examples of the tertiary amine include 1,8-diazabicyclo(5,4,0)undecene-7, triethylenediamine, benzyldimethylamine, triethanolamine, dimethylaminoethanol, and tris(dimethylaminomethyl)phenol.

Only one of these tertiary amines may be used, or two or more thereof may be combined and used in any combination in an optional blending ratio.

The tertiary amine above is preferably used in an amount ranging from 0.8 to 1.5 in terms of equivalent ratio of a functional group in the curing agent to an epoxy group in entire epoxy resin components contained in the epoxy resin composition (B). The amount within this range is preferred, since an unreacted epoxy group or a functional group of the curing agent is less likely to remain.

<Acid Anhydride Curing Agent>

The acid anhydride curing agent includes an acid anhydride and a modified acid anhydride.

The acid anhydride includes, for example, phthalic anhydride, trimellitic anhydride, pyromellitic anhydride, benzophenonetetracarboxylic anhydride, dodecenylsuccinic anhydride, polyadipic anhydride, polyazelaic anhydride, polysebacic anhydride, poly(ethyloctadecane diacid) anhydride, poly(phenylhexadecane diacid) anhydride, tetrahydrophthalic anhydride, methyltetrahydrophthalic anhydride, methylhexahydrophthalic anhydride, hexahydrophthalic anhydride, methylhimic anhydride, trialkyltetrahydrophthalic anhydride, methylcyclohexenedicarboxylic anhydride, methylcyclohexenetetracarboxylic anhydride, ethylene glycol bistrimellitate dianhydride, HET anhydride, nadic anhydride, methyl nadic anhydride, 5-(2,5-dioxotetrahydro-3-furanyl)-3-methyl-3-cyclohexane-1,2-dicarboxylic anhydride, 3,4-dicarboxy-1,2,3,4-tetrahydro-1-naphthalenesuccinic dianhydride, and 1-methyl-dicarboxy-1,2,3,4-tetrahydro-1-naphthalenesuccinic dianhydride.

The modified acid anhydride includes, for example, those obtained by modifying the above-described acid anhydrides with a glycol. Examples of the glycol which can be used for the modification include alkylene glycols such as ethylene glycol, propylene glycol and neopentyl glycol, and polyether glycols such as polyethylene glycol, polypropylene glycol and polytetramethylene ether glycol. Further, a copolymerized polyether glycol of two or more kinds of these glycols and/or polyether glycols can also be used.

In the modified acid anhydride, the acid anhydride is preferably modified with 0.4 mol or less of glycol per 1 mol of the acid anhydrid. When the modification amount is smaller than or equal to the upper limit value above, the viscosity of the epoxy resin composition does not become excessively high, and it is likely that the workability is improved and a favorable curing reaction rate with the epoxy resin is realized.

Only one of these acid anhydride curing agents may be used, or two or more thereof may be combined and used in any combination in an optional blending ratio.

In the case of using an acid anhydride curing agent, the acid anhydride curing agent is preferably used in an amount ranging from 0.8 to 1.5 in terms of equivalent ratio of a functional group in the curing agent to an epoxy group in entire epoxy resin components contained in the epoxy resin composition (B). The amount within this range is preferred, since an unreacted epoxy group or a functional group of the curing agent is less likely to remain.

<Amide Curing Agent>

Examples of the amide curing agent include dicyandiamide, a derivative thereof, and a polyamide resin.

Only one of these amide curing agents may be used, or two or more thereof may be used in any combination in an optional blending ratio.

In the case of using an amide curing agent, the amide curing agent is preferably used in an amount of 0.1 to 20% by weight relative to a total of entire epoxy resin components and the amide curing agent in the epoxy resin composition (B).

<Imidazoles>

Examples of the imidazoles include 2-phenylimidazole, 2-ethyl-4(5)-methylimidazole, 2-phenyl-4-methylimidazole, 1-benzyl-2-methylimidazole, 1-benzyl-2-phenylimidazole, 1-cyanoethyl-2-undecylimidazole, 1-cyano-2-phenylimidazole, 1-cyanoethyl-2-undecylimidazole trimellitate, 1-cyanoethyl-2-phenylimidazolium trimellitate, 2,4-diamino-6-[2'-methylimidazolyl-(1')]-ethyl-s-triazine, 2,4-diamino-6-[2'-ethyl-4'-methylimidazolyl-(1')]-ethyl-s-triazine, a 2,4-diamino-6-[2'-methylimidazolyl-(1')]-ethyl-s-triazine isocyanuric acid adduct, a 2-phenylimidazole isocyanuric acid adduct, 2-phenyl-4,5-dihydroxymethylimidazole, 2-phenyl-4-methyl-5-hydroxymethylimidazole, and an adduct of epoxy resin to the imidazoles above. In this connection, the imidazoles have a catalytic ability and therefore, may be generally classified into a curing accelerator but are classified into a curing agent in the present invention.

Only one of the above imidazoles may be used, or two or more thereof may be mixed and used in any combination in an optional ratio.

In the case of using imidazoles, the imidazoles are preferably used to in an amount of 0.1 to 20% by weight relative to a total of entire epoxy resin components and the imidazoles in the epoxy resin composition (B).

<Other Curing Agents>

In the epoxy resin composition (B) of the present invention, a curing agent other than the above-described curing agents can be used. The other curing agent that can be used in the epoxy resin composition (B) of the present invention is not particularly limited, and all of those known in general as a curing agent for epoxy resins can be used.

Only one of these other curing agents may be used, or two or more thereof may be used in combination.

[Other Epoxy Resin]

The epoxy resin composition (B) of the present invention may further contain other epoxy resin, in addition to the epoxy resin composition (A). By incorporating the other epoxy resin, the heat resistance, stress resistance, moisture absorption resistance, flame retardancy, etc., of the epoxy resin composition (B) of the present invention can be enhanced.

As the other epoxy resin that can be used in the epoxy resin composition (B) of the present invention, all epoxy resins except for the epoxy resins (mainly the epoxy resin (1) and the epoxy resin (2)) contained in the epoxy resin composition (A) are appropriate. Specific examples thereof include a bisphenol A type epoxy resin, a trisphenolmethane type epoxy resin, an anthracene type epoxy resin, a phenol-modified xylene resin type epoxy resin, a bisphenol cyclododecyl type epoxy resin, a bisphenol diisopropylidene resorcin type epoxy resin, a bisphenol F type epoxy resin, a bisphenol AD type epoxy resin, a hydroquinone type epoxy resin, a methylhydroquinone type epoxy resin, a dibutylhydroquinone type epoxy resin, a resorcin type epoxy resin, a methylresorcin type epoxy resin, a biphenol type epoxy resin, a tetramethylbiphenol type epoxy resin except for the epoxy resin (1) and the epoxy resin (2) in the epoxy resin composition (A), a tetramethylbiphenol F type epoxy resin, a dihydroxydiphenyl ether type epoxy resin, an epoxy resin derived from thiodiphenols, a dihydroxynaphthalene type epoxy resin, a dihydroxyanthracene type epoxy resin, a dihydroxydihydroanthracene type epoxy resin, a dicyclopentadiene type epoxy resin, an epoxy resin derived from dihydroxystilbenes, a phenol novolak type epoxy resin, a cresol novolak type epoxy resin, a bisphenol A novolak type epoxy resin, a naphthol novolak type epoxy resin, a phenol aralkyl type epoxy resin, a naphthol aralkyl type epoxy resin, a biphenyl aralkyl type epoxy resin, a terpene phenol type epoxy resin, a dicyclopentadiene phenol type epoxy resin, an epoxy resin derived from a phenol-hydroxybenzaldehyde condensate, an epoxy resin derived from a phenol-crotonaldehyde condensate, an epoxy resin derived from a phenol-glyoxal condensate, an epoxy resin derived from a co-condensed resin of heavy oil or pitches with phenols and formaldehydes, an epoxy resin derived from diaminodiphenylmethane, an epoxy resin derived from aminophenol, an epoxy resin derived from xylenediamine, an epoxy resin derived from a methylhexahydrophthalic acid, and an epoxy resin derived from a dimer acid.

Only one of these may be used, or two or more thereof may be used in any combination in an optional blending ratio.

Among these epoxy resins, from the viewpoint of fluidity of the composition as well as the heat resistance, moisture absorption resistance, flame retardancy, etc., of a cured product, a bisphenol A type epoxy resin, a tetramethylbiphenol type epoxy resin except for the epoxy resin (1) and the epoxy resin (2) in the epoxy resin composition (A), a, 4,4'-biphenol epoxy type resin, a biphenyl aralkyl type epoxy resin, a phenol aralkyl type epoxy resin, a dihydroxyanthracene type epoxy resin, a dicyclopentadiene type epoxy resin, an ortho-cresol novolak type epoxy resin, and a trisphenolmethane type epoxy resin are particularly preferred.

In the case where the epoxy resin composition (B) of the present invention contains the other epoxy resin above, the content thereof is preferably from 0.01 to 60 parts by weight, more preferably 40 parts by weight or less, still more preferably 30 parts by weight or less, and particularly preferably 20 parts by weight or less, relative to 100 parts by weight of entire epoxy resin components in the composition, and on the other hand, the content is preferably 1 part by weight or more.

[Curing Accelerator]

The epoxy resin composition of the present invention preferably contains a curing accelerator. When a curing accelerator is contained, it becomes possible to shorten the curing time, lower the curing temperature and as a result, facilitate obtaining a desired cured product.

The curing accelerator is not particularly limited, and specific examples thereof include a phosphorus compound such as organic phosphines and phosphonium salt, a tetraphenylboronate, an organic acid dihydrazide, and a halogenated boron amine complex.

Examples of the phosphorus compound usable as the curing accelerator include organic phosphines such as triphenylphosphine, diphenyl(p-tolyl)phosphine, tris(alkylphenyl)phosphine, tris(alkoxyphenyl)phosphine, tris(alkyl alkoxyphenyl)phosphine, tris(dialkylphenyl)phosphine, tris(trialkylphenyl)phosphine, tris(tetraalkylphenyl)phosphine, tris(dialkoxyphenyl)phosphine, tris(trialkoxyphenyl)phosphine, tris(tetraalkoxyphenyl)phosphine, trialkylphosphine, dialkylarylphosphine and alkyldiarylphosphine; a complex of the organic phosphines above and organoborons; and a compound obtained by adding to the organic phosphines above a maleic anhydride, a quinone compound such as 1,4-benzoquinone, 2,5-toluquinone, 1,4-naphthoquinone, 2,3-dimethylbenzoquinone, 2,6-dimethylbenzoquinone, 2,3-dimethoxy-5-methyl-1,4-benzoquinone, 2,3-dimethoxy-1,4-benzoquinone and phenyl-1,4-benzoquinone, or a compound such as diazophenylmethane.

Among the above curing accelerators, organic phosphines and a phosphonium salt are preferred, and organic phosphines are most preferred. Only one of the above curing accelerators may be used, or two or more thereof may be mixed and used in any combination in an optional ratio.

The curing accelerator is preferably used in an amount ranging from 0.1 to 20 parts by weight relative to 100 parts by weight of entire epoxy resin components in the epoxy resin composition (B). The content is more preferably 0.5 part by weight or more, and still more preferably 1 part by weight or more, and on the other hand, is more preferably 15 parts by weight or less, and still more preferably 10 parts by weight or less. When the content of the curing accelerator is larger than or equal to the lower limit value described above, a good curing acceleration effect can be obtained, whereas when the content is smaller than or equal to the upper limit value described above, it is easy to obtain desired curing physical properties, which is preferable.

[Inorganic Filler]

In the epoxy resin composition (B) of the present invention, an inorganic filler can be blended. Examples of the inorganic filler include fused silica, crystalline silica, glass powder, alumina, calcium carbonate, calcium sulfate, talc, and boron nitride. Only one of these inorganic fillers may be used, or two or more thereof may be combined and used in any combination in an optional blending ratio. Among these, in the case of using the composition for semiconductor sealing, a fused and/or crystalline silica powder filler of crushed type and/or spherical form is preferred.

When the inorganic filler is used, in the case of using the epoxy resin composition (B) as a semiconductor sealing material, the coefficient of thermal expansion of the semiconductor sealing material can be made close to that of an internal silicon chip or lead frame and in addition, the moisture absorption amount of the semiconductor sealing material as a whole can be reduced, so that solder crack resistance can be enhanced.

The average particle diameter of the inorganic filler is generally from 1 to 50 µm, preferably from 1.5 to 40 µm, and more preferably from 2 to 30 µm. The average particle diameter is preferably larger than or equal to the lower limit value described above since the melt viscosity does not become excessively high and the fluidity is less likely to lower, and the average particle diameter is preferably smaller than or equal to the upper limit value described above since the filler hardly causes clogging in a narrow gap of a die at the time of molding and the filling property of a material is likely to be enhanced.

In the case of using an inorganic filler in the epoxy resin composition (B) of the present invention, the inorganic filler is preferably blended in the range of from 60 to 95% by weight of the epoxy resin composition as a whole.

[Release Agent]

In the epoxy resin composition (B) of the present invention, a release agent can be blended. As the release agent, for example, a natural wax such as carnauba wax, a synthetic wax such as polyethylene wax, higher fatty acids and metal salts thereof such as stearic acid and a zinc stearate, and a hydrocarbon release agent such as paraffin, can be used. Only one of these release agents may be used, or two or more thereof may be combined and used in any combination in an optional blending ratio.

In the case of blending a release agent in the epoxy resin composition (B) of the present invention, a blending amount of the release agent is preferably from 0.1 to 5.0 parts by weight, and more preferably from 0.5 to 3.0 parts by weight, relative to 100 parts by weight of entire epoxy resin components in the epoxy resin composition (B). The blending amount of the release agent is preferably within the range above, since a good releasing property can be exhibited with maintaining the curing characteristics of the epoxy resin composition (B).

[Coupling Agent]

In the epoxy resin composition (B) of the present invention, a coupling agent is preferably blended. The coupling agent is preferably used in combination with an inorganic filler, and when a coupling agent is blended, the adhesiveness of the epoxy resin as a matrix to the inorganic filler can be enhanced. Examples of the coupling agent include a silane coupling agent and a titanate coupling agent.

Examples of the silane coupling agent include an epoxy silane such as γ-glycidoxypropyltrimethoxysilane, γ-glycidoxypropyltriethoxysilane and β-(3,4-epoxycyclohexyl)ethyltrimethoxysilane; an aminosilane such as γ-aminopropyltriethoxysilane, N-β(aminoethyl)γ-aminopropyltrimethoxysilane, N-β(aminoethyl)γ-aminopropylmethyldimethoxysilane, γ-aminopropyltrimethoxysilane and γ-ureidopropyltriethoxysilane; a mercaptosilane such as 3-mercaptopropyltrimethoxysilane, a vinyl silane such as p-styryltrimethoxysilane, vinyltrichlorosilane, vinyltris(β-methoxyethoxy) silane, vinyltrimethoxysilane, vinyltriethoxysilane and γ-methacryloxypropyltrimethoxysilane; and epoxy-based, amino-based and vinyl-based silanes of a high molecular type.

Examples of the titanate coupling agent includes isopropyltriisostearoyl titanate, isopropyltri(N-aminoethyl-aminoethyl) titanate, diisopropylbis(dioctyl phosphate) titanate, tetraisopropylbis(dioctylphosphite) titanate, tetraoctylbis(ditridecylphosphite) titanate, tetra(2,2-diallyloxymethyl-1-butyl)bis(ditridecyl)phosphite titanate, bis(dioctylpyrophosphate)oxyacetate titanate, and bis(dioctylpyrophosphate) ethylene titanate.

Only one of these coupling agents may be used, or two or more thereof may be mixed and used in any combination in an optional ratio.

In the case of using a coupling agent in the epoxy resin composition (B) of the present invention, the blending amount thereof is preferably from 0.1 to 3.0 parts by weight relative to 100 parts by weight of the entire epoxy resin components. The blending amount of the coupling agent is preferably larger than or equal to the lower limit value described above since an effect of increasing an adhesiveness of the epoxy resin as a matrix to an inorganic filler due to blending of the coupling agent tends to be enhanced, and on the other hand, the blending amount of the coupling agent is preferably smaller than or equal to the upper limit value described above since the coupling agent is less likely to bleed out from an obtained cured product.

[Other Blending Component]

In the epoxy resin composition (B) of the present invention, a component other than those described above (in the present invention, the component is sometimes referred to as "other blending component") may be blended. Examples of the other blending component include a flame retardant, a plasticizer, a reactive diluent, and a pigment, and the above can be appropriately blended as needed. However, it is not excluded to blend a component other than the components described above in the epoxy resin composition (B) of the present invention.

Examples of the flame retardant for use in the epoxy resin composition (B) of the present invention include a halogen flame retardant such as brominated epoxy resin and brominated phenol resin, an antimony compound such as antimony trioxide, a phosphorus flame retardant such as red phosphorus, phosphoric acid esters and phosphines, a nitrogen flame retardant such as melamine derivative, and an inorganic flame retardant such as aluminum hydroxide and magnesium hydroxide.

[Cured Product]

The cured product of the present invention can be obtained by curing the epoxy resin composition (B) of the present invention. The cured product of the present invention obtained by curing the epoxy resin composition (B) of the present invention has excellent properties in terms of heat resistance.

Although the method for curing the epoxy resin composition (B) of the present invention is not particularly limited, generally, the cured product can be obtained by a thermosetting reaction by heating. At the time of thermosetting reaction, it is preferable to appropriately select a curing temperature according to a kind of the curing agent used. For example, in the case of using a phenolic curing agent, the curing temperature is generally from 130° C. to 300° C. In addition, the curing temperature can be lowered by adding a curing accelerator to the curing agent. A reaction time is preferably from 1 to 20 hours, more preferably from 2 to 18 hours, and still more preferably from 3 to 15 hours. The reaction time is preferably longer than or equal to the lower limit value described above since the curing reaction tends to sufficiently proceed with ease. On the other hand, the reaction time is preferably shorter than or equal to the upper limit value described above since deterioration due to heating and an energy loss during the heating are readily reduced.

The epoxy resin composition (B) of the present invention can provide a cured product having excellent heat resistance and preferably having a glass transition temperature (Tg) of 150° C. or higher. Higher the glass transition temperature of the cured product is, less generating a thermal stress in a resin sealed in the case of use as a semiconductor sealing material, etc., by which passivation and damage to chip and failure such as sliding and package cracking of aluminum wiring are less likely to occur.

Here, the glass transition temperature (Tg) is measured by the method described in Examples later.

[Application]

The epoxy resin composition (A) of the present invention has an excellent handleability, the epoxy resin composition (B) of the present invention containing the epoxy resin composition (A) of the present invention has an excellent curability, and the cured product of the epoxy resin composition (B) of the present invention has an excellent heat resistance.

Therefore, the epoxy resin composition (A), and the epoxy resin composition (B) and the cured product thereof of the present invention can be effectively used for any application as long as these properties are required. For example, the epoxy resin composition (A), and the epoxy resin composition (B) and the cured product thereof of the present invention can be suitably used for any application in the fields including: paints such as electrodeposition paint for automobiles, heavy duty paint for vessels and bridges and paint for internal coating of beverage can; electrics and electronics such as laminate sheet, semiconductor sealing material, insulating powdery paint and coil impregnation; civil engineering, constructions and adhesives in seismic strengthening of bridges, concrete reinforcement, flooring of buildings, lining of water utilities, drainage and water permeation pavement, and adhesive for vehicles and aircrafts; etc. Among these, the epoxy resin composition (A), and the epoxy resin composition (B) and the cured product thereof of the present invention are useful particularly for various electric or electronic applications such as semiconductor sealing material and laminate sheet.

The epoxy resin composition (B) of the present invention may be cured and then used for the above-described applications or may be cured in the production process of the above-described applications.

EXAMPLES

Hereinafter, although the present invention is described more concretely based on Examples, the present invention is not limited at all by the following Examples. The values of various production conditions and evaluation results in the following Examples have meanings as preferred values of the upper limit or the lower limit in the embodiment of the present invention. A preferred range may be a range defined by a combination of the above upper limit or lower limit and the values of the following Examples or a combination of values of the Examples.

[Production of Crude Epoxy resin, Production of Epoxy Resin Composition (A), and Evaluation]

Production Example 1

Into a four-necked flask having an inner volume of 5 L and equipped with a thermometer, a stirrer, and a cooling tube, 200 g of tetramethylbiphenol (manufactured by Mitsubishi Chemical Corporation), 436 g of epichlorohydrin, and 72 g of isopropyl alcohol were charged. The contents were uniformly dissolved by raising the temperature to 40° C., and 188 g of 48.5% by weight of an aqueous sodium hydroxide solution was then added dropwise over 90 minutes. At the same time as the dropping, the temperature was raised from 40° C. to 65° C. over 90 minutes. Thereafter, the temperature was kept at 65° C. for 30 minutes to complete the reaction, and the reaction solution was transferred to a 5 L separating funnel. After adding 500 g of warm water at 65° C. thereto, the reaction solution was cooled to 65° C., followed by standing still for 1 hour. After standing, the water layer was extracted from the separated oil layer and water layer to remove a by-product salt and excess sodium hydroxide. Then, water washing was performed three times using 500 g of warm water at 65° C. Thereafter, the epichlorohydrin and isopropyl alcohol were completely removed under reduced pressure at 150° C. to obtain an epoxy resin composition (A-01) having an epoxy equivalent of 217 g/equivalent.

As a result of LC analysis, it was confirmed that the Area % of the epoxy resin (1) in the obtained epoxy resin composition (A-01) was 0%.

Example 1

Into a four-necked flask having an inner volume of 2 L and equipped with a thermometer, a stirrer, and a cooling tube, 100 g of the epoxy resin composition (A-01) obtained in Production Example 1, 120 g of methyl isobutyl ketone, and 30 g of dimethyl sulfoxide were charged. The contents were uniformly dissolved by raising the reaction temperature to 80° C., and 1.9 g of 8% by weight of a potassium hydroxide/isopropanol solution was then added to carry out the reaction for 1 hour. Thereafter, 30 g of methyl isobutyl ketone was added, and then water washing was performed four times by using 200 g of water. Thereafter, the methyl isobutyl ketone was completely removed under reduced pressure at 150° C. to obtain an epoxy resin composition (A-1) of Example 1.

As a result of LC analysis, it was confirmed that the Area % of the epoxy resin (1) in the obtained epoxy resin composition (A-1) was 0.9%.

The epoxy resin (1) was fractionated from the epoxy resin composition (A-1) obtained in Example 1 by preparative GPC, and was confirmed as the epoxy resin (1) represented by formula (1) by using $^1$H-NMR analysis. FIG. 1 shows the $^1$H-NMR chart.

Example 2

Into a four-necked flask having an inner volume of 2 L and equipped with a thermometer, a stirrer, and a cooling tube, 100 g of the epoxy resin composition (A-01) obtained in Production Example 1, 120 g of methyl isobutyl ketone, and 30 g of dimethyl sulfoxide were charged. The contents were uniformly dissolved by raising the reaction temperature to 80° C., and 0.2 g of 8% by weight of a potassium hydroxide/isopropanol solution was then added to carry out the reaction for 1 hour. Thereafter, 30 g of methyl isobutyl ketone was added, and then water washing was performed four times by using 200 g of water. Thereafter, the methyl isobutyl ketone was completely removed under reduced pressure at 150° C. to obtain an epoxy resin composition (A-2) of Example 2.

As a result of LC analysis, it was confirmed that the Area % of the epoxy resin (1) in the obtained epoxy resin composition (A-2) was 0.1%.

Example 3

Into a four-necked flask having an inner volume of 2 L and equipped with a thermometer, a stirrer, and a cooling tube, 100 g of the epoxy resin composition (A-01) obtained in Production Example 1, 120 g of methyl isobutyl ketone, and 30 g of dimethyl sulfoxide were charged. The contents were uniformly dissolved by raising the reaction temperature to 80° C., and 1.0 g of 8% by weight of a potassium hydroxide/isopropanol solution was then added to carry out the reaction for 1 hour. Thereafter, 30 g of methyl isobutyl ketone was added, and then water washing was performed four times by using 200 g of water. Thereafter, the methyl isobutyl ketone was completely removed under reduced pressure at 150° C. to obtain an epoxy resin composition (A-3) of Example 3.

As a result of LC analysis, it was confirmed that the Area % of the epoxy resin (1) in the obtained epoxy resin composition (A-3) was 0.5%.

Production Example 2

Into a four-necked flask having an inner volume of 5 L and equipped with a thermometer, a stirrer, and a cooling tube, 200 g of tetramethylbiphenol (manufactured by Mitsubishi Chemical Corporation), 916 g of epichlorohydrin, and 72 g of isopropyl alcohol were charged. The contents were uniformly dissolved by raising the temperature to 40° C., and 158 g of 48.5% by weight of an aqueous sodium hydroxide solution was then added dropwise over 90 minutes. At the same time as the dropping, the temperature was raised from 40° C. to 65° C. over 90 minutes. Thereafter, the temperature was kept at 65° C. for 30 minutes to complete the reaction, and the reaction solution was transferred to a 5 L separating funnel. By adding 500 g of warm water at 65° C. thereto, the reaction solution was cooled to 65° C., followed by standing still for 1 hour. After standing, the water layer was extracted from the separated oil layer and water layer to remove a by-product salt and excess sodium hydroxide. Then, water washing was performed three times by using 500 g of warm water at 65° C. Thereafter, the epichlorohydrin and isopropyl alcohol were completely removed under reduced pressure at 150° C. to obtain an epoxy resin composition (A-02) having an epoxy equivalent of 186 g/equivalent.

As a result of LC analysis, it was confirmed that the Area % of the epoxy resin (1) in the obtained epoxy resin composition (A-02) was 0%.

Example 4

Into a four-necked flask having an inner volume of 2 L and equipped with a thermometer, a stirrer, and a cooling tube, 100 g of the epoxy resin composition (A-02) obtained in Production Example 2, 120 g of methyl isobutyl ketone, and 30 g of dimethyl sulfoxide were charged. The contents were uniformly dissolved by raising the reaction temperature to 70° C., and 5.0 g of 8% by weight of a potassium hydroxide/isopropanol solution was then added to carry out the reaction for 1 hour. Thereafter, 30 g of methyl isobutyl ketone was added, and then water washing was performed four times by using 200 g of water. Thereafter, the methyl isobutyl ketone was completely removed under reduced pressure at 150° C. to obtain an epoxy resin composition (A-4) of Example 4.

As a result of LC analysis, it was confirmed that the Area % of the epoxy resin (1) in the obtained epoxy resin composition (A-4) was 0.7%.

Example 5

Into a four-necked flask having an inner volume of 2 L and equipped with a thermometer, a stirrer, and a cooling tube, 100 g of the epoxy resin composition (A-02) obtained in Production Example 2, 120 g of methyl isobutyl ketone, and 30 g of dimethyl sulfoxide were charged. The contents were uniformly dissolved by raising the reaction temperature to 70° C., and 2.6 g of 8% by weight of a potassium hydroxide/isopropanol solution was then added to carry out the reaction for 1 hour. Thereafter, 30 g of methyl isobutyl ketone was added, and then water washing was performed four times by using 200 g of water. Thereafter, the methyl isobutyl ketone was completely removed under reduced pressure at 150° C. to obtain an epoxy resin composition (A-5) of Example 5.

As a result of LC analysis, it was confirmed that the Area % of the epoxy resin (1) in the obtained epoxy resin composition (A-5) was 0.3%.

Comparative Example 1

Into a four-necked flask having an inner volume of 2 L and equipped with a thermometer, a stirrer, and a cooling tube, 100 g of the epoxy resin composition (A-01) obtained in Production Example 1, 120 g of methyl isobutyl ketone, and 30 g of dimethyl sulfoxide were charged. The contents were uniformly dissolved by raising the reaction temperature to 80° C., and 11.0 g of 8% by weight of a potassium hydroxide/isopropanol solution was then added to carry out the reaction for 1 hour. Thereafter, 30 g of methyl isobutyl ketone was added, and then water washing was performed four times by using 200 g of water. Thereafter, the methyl isobutyl ketone was completely removed under reduced pressure at 150° C. to obtain an epoxy resin composition (A-6) of Comparative Example 1.

As a result of LC analysis, it was confirmed that the Area % of the epoxy resin (1) in the obtained epoxy resin composition (A-6) was 5.0%.

Comparative Example 2

Into a four-necked flask having an inner volume of 2 L and equipped with a thermometer, a stirrer, and a cooling tube, 100 g of the epoxy resin composition (A-01) obtained in Production Example 1, 120 g of methyl isobutyl ketone, and 30 g of dimethyl sulfoxide were charged. The contents were uniformly dissolved by raising the reaction temperature to 80° C., and 2.5 g of 8% by weight of a potassium hydroxide/isopropanol solution was then added to carry out the reaction for 1 hour. Thereafter, 30 g of methyl isobutyl ketone was added, and then water washing was performed four times by using 200 g of water. Thereafter, the methyl isobutyl ketone was completely removed under reduced pressure at 150° C. to obtain an epoxy resin composition (A-7) of Comparative Example 2.

As a result of LC analysis, it was confirmed that the Area % of the epoxy resin (1) in the obtained epoxy resin composition (A-7) was 1.1%.

Comparative Example 3

Into a four-necked flask having an inner volume of 2 L and equipped with a thermometer, a stirrer, and a cooling tube, 100 g of the epoxy resin composition (A-02) obtained in Production Example 2, 120 g of methyl isobutyl ketone, and 30 g of dimethyl sulfoxide were charged. The contents were uniformly dissolved by raising the reaction temperature to 65° C., and 5.0 g of 8% by weight of a potassium hydroxide/isopropanol solution was then added to carry out the reaction for 1 hour. Thereafter, 30 g of methyl isobutyl ketone was added, and then water washing was performed four times by using 200 g of water. Thereafter, the methyl isobutyl ketone was completely removed under reduced pressure at 150° C. to obtain an epoxy resin composition (A-8) of Comparative Example 3.

As a result of LC analysis, it was confirmed that the Area % of the epoxy resin (1) in the obtained epoxy resin composition (A-8) was 0%.

Comparative Example 4

An epoxy resin composition was synthesized according to the method described in Example 1 of Patent Document 1. Namely, into a three-necked flask having an inner volume of 1 L and equipped with a stirrer, a thermometer, and a cooler, 121.2 g of tetramethylbiphenol (manufactured by Mitsubishi Chemical Corporation), 370 g of epichlorohydrin, and 2.42 g of tetramethyl ammonium chloride were charged. The contents were heated to 130° C. and subjected to an addition reaction at the same temperature for 2 hours under reflux. Subsequently, the contents were cooled to 60° C., and a water removing device was attached. Into the reactor, 42 g of sodium hydroxide was added, and the generated water was continuously azeotropically removed under the conditions of a reaction temperature of 60° C. and a degree of reduced pressure of 150 mmHg to carry out a ring closure reaction. The point at which the generated water reached 18 mL was taken as the reaction end point. After recovering excess epichlorohydrin under reduced pressure, 500 mL of toluene was added, and the mixture was washed three times by using 1 L of water to remove salt, remaining alkali, and a catalyst. The toluene was removed under reduced pressure by using a rotary evaporator to obtain an epoxy resin composition (A-9).

As a result of LC analysis, it was confirmed that the Area % of the epoxy resin (1) in the obtained epoxy resin composition (A-9) was 0%.

Comparative Example 5

An epoxy resin composition was synthesized according to the method described in Example 1 of Patent Document 2. Namely, in a flask equipped with a thermometer, a dropping funnel, a cooling tube, and a stirrer, 121 g of tetramethylbiphenol (manufactured by Mitsubishi Chemical Corporation) was dissolved in 370 g of epichlorohydrin and 92.5 g of dimethyl sulfoxide with purging the flask with nitrogen gas. Next, the contents were heated to 45° C., and 40 g of sodium hydroxide in the form of flakes was added in portions over 100 minutes. Thereafter, the contents were further reacted at 45° C. for 2 hours and at 70° C. for 30 minutes. After completion of the reaction, excess epichlorohydrin, dimethyl sulfoxide and the like were distilled off under heating and reduced pressure at 130° C. by using a rotary evaporator, and 354 g of methyl isobutyl ketone was added to the residue and dissolved. The methyl isobutyl ketone solution was heated to 70° C., 10 g of 30% by weight of an aqueous sodium hydroxide solution was added, and the mixture was allowed to react for 1 hour. Then, water washing was repeated until the pH of the washing solution became neutral. Further, the water layer was separated and removed, and methyl isobutyl ketone was distilled off from the oil layer under reduced pressure by heating by using a rotary evaporator to obtain an epoxy resin composition (A-10).

As a result of LC analysis, it was confirmed that the Area % of the epoxy resin (1) in the obtained epoxy resin composition (A-10) was 0%.

Comparative Example 6

An epoxy resin composition was synthesized according to the method described in Example 2 of Patent Document 2. Namely, the reaction was carried out in the same manner as in Comparative Example 5 to obtain an epoxy resin composition (A-11), except that the amount of epichlorohydrin used was changed to 555 g and the amount of dimethyl sulfoxide was changed to 139 g.

As a result of LC analysis, it was confirmed that the Area % of the epoxy resin (1) in the obtained epoxy resin composition (A-11) was 0%.

Comparative Example 7

An epoxy resin composition was synthesized according to the method described in Example 5 of Patent Document 3. Namely, into a three-necked flask having an inner volume of 3 L and equipped with a thermometer, a stirrer, and a cooling tube, 100 g of tetramethylbiphenol type epoxy resin "YX4000" (manufactured by Mitsubishi Chemical Corporation), and 270 g of toluene were charged. The contents were uniformly dissolved and mixed, then 30 g of dimethyl sulfoxide was added and mixed, and the temperature was raised to 70° C. With stirring, 3.91 g of isopropyl alcohol and 0.69 g of potassium hydroxide were added at a time, and the contents were reacted for 60 minutes. Then, 150 g of water was added to stop the reaction, followed by standing still to separate, and the water layer was removed. Subsequently, 500 mL of 0.1% by weight of an aqueous sodium monophosphate solution was added to an organic layer, and the mixture was stirred at 70° C. for 10 minutes, and washed by using neutralized water. The stirring was stopped, followed by standing still to separate, and the water layer was removed. Further, the product was washed twice by using 500 mL of warm water at 70° C. to remove a by-product salt, excess alkali, dimethyl sulfoxide, alcohol and the like. Next, the organic solvent was distilled off from the organic layer under reduced pressure. Finally, a condition of 10 Torr and 160° C. was maintained for 30 minutes to almost completely remove volatile components, by which an epoxy resin composition (A-12) was obtained.

As a result of LC analysis, it was confirmed that the Area % of the epoxy resin (1) in the obtained epoxy resin composition (A-12) was 0%.

Comparative Example 8

An epoxy resin composition was synthesized according to the method described in Example 6 of Patent Document 3. Namely, into a three-necked flask having an inner volume of 3 L and equipped with a thermometer, a stirrer, and a cooling tube, 100 g of tetramethylbiphenol type epoxy resin "YX4000" (manufactured by Mitsubishi Chemical Corporation), and 160 g of methyl isobutyl ketone were charged. The contents were uniformly dissolved and mixed, then 22 g of dimethyl sulfoxide was added and mixed, and the temperature was raised to 60° C. With stirring, 2.21 g of isopropyl alcohol and 0.39 g of sodium hydroxide were added at a time, and the contents were reacted for 90 minutes. Then, 150 g of methyl isobutyl ketone and 200 g of water were added to stop the reaction, followed by standing still to separate. Thus, the water layer was removed. Subsequently, 500 mL of 0.1% by weight of an aqueous sodium monophosphate solution was added to the organic layer, and the mixture was stirred at 70° C. for 10 minutes, and washed by using neutralized water. The stirring was stopped, followed by standing still to separate, and the water layer was removed. Further, the product was washed twice by using 500 mL of warm water at 70° C. to remove a by-product salt, excess alkali, dimethyl sulfoxide, alcohol and the like. Next, the organic solvent was distilled off from the organic layer under reduced pressure. Finally, a condition of 10 Torr and 160° C. was maintained for 30 minutes to almost completely remove volatile components, by which an epoxy resin composition (A-13) was obtained.

As a result of LC analysis, it was confirmed that the Area % of the epoxy resin (1) in the obtained epoxy resin composition (A-13) was 0%.

Comparative Example 9

An epoxy resin composition was synthesized according to the method described in Comparative Example 5 of Patent Document 3. Namely, into a three-necked flask having an inner volume of 3 L and equipped with a thermometer, a stirrer, and a cooling tube, 100 g of tetramethylbiphenol type epoxy resin "YX4000" (manufactured by Mitsubishi Chemical Corporation), and 160 g of methyl isobutyl ketone were charged. The contents were uniformly dissolved and mixed, then 22 g of dimethyl sulfoxide was added and mixed, and the temperature was raised to 60° C. With stirring, 2.21 g of isopropyl alcohol and 0.39 g of sodium hydroxide were added at a time, and the contents were reacted for 90 minutes. Then, 200 g of methyl isobutyl ketone was added to stop the reaction. Thereafter, 500 mL of 0.1% by weight of an aqueous sodium monophosphate solution was added, and the mixture was stirred at 70° C. for 10 minutes, and washed by using neutralized water. The stirring was stopped, followed by standing still to separate, and the water layer was removed. Further, the product was washed twice by using 500 mL of warm water at 70° C. to remove a by-product salt, excess alkali, dimethyl sulfoxide, alcohol and the like. Next, the organic solvent was distilled off from the organic layer under reduced pressure. Finally, a condition of 10 Torr and 160° C. was maintained for 30 minutes to almost completely remove volatile components, by which an epoxy resin composition (A-14) was obtained.

As a result of LC analysis, it was confirmed that the Area % of the epoxy resin (1) in the obtained epoxy resin composition (A-14) was 0%.

Comparative Example 10

The epoxy resin composition was synthesized according to the method described in Comparative Example 6 of Patent Document 3. That is, into a three-necked flask having an inner volume of 3 L and equipped with a thermometer, a stirrer, and a cooling tube, 100 g of tetramethylbiphenol type epoxy resin "YX4000" (manufactured by Mitsubishi Chemical Corporation), and 160 g of methyl isobutyl ketone were charged. The contents were uniformly dissolved and mixed, then 22 g of dimethyl sulfoxide was added and mixed, and the temperature was raised to 60° C. With stirring, 2.21 g of isopropyl alcohol and 0.39 g of sodium hydroxide were added at a time, and the contents were reacted for 90 minutes. Then, carbon dioxide gas was blown for 10 minutes, and 150 g of methyl isobutyl ketone was added to stop the reaction. Subsequently, 500 mL of warm water at 70° C. was added, and the mixture was stirred at 70° C. for 10 minutes and washed by using water. Then, the stirring was stopped, followed by standing still to separate, and the water layer was removed. Subsequently, the product was further washed twice by using 500 mL of warm water at 70° C. to remove a by-product salt, excess alkali, dimethyl sulfoxide, alcohol and the like. Next, the organic solvent was distilled off from the organic layer under reduced pressure. Finally, a condition of 10 Torr and 160° C. was maintained for 30 minutes to almost completely remove volatile components, by which an epoxy resin composition (A-15) was obtained.

As a result of LC analysis, it was confirmed that the Area % of the epoxy resin (1) in the obtained epoxy resin composition (A-15) was 0%.

Comparative Example 11

An epoxy resin composition was synthesized according to the method described in Example 3 of Patent Document 4. Namely, into a 1 L separable flask equipped with a stirrer, a thermometer and a condenser, 150 g of tetramethylbiphenol type epoxy resin "YX4000" (manufactured by Mitsubishi Chemical Corporation, having an epoxy equivalent of 186 g/equivalent), and 470 g of methyl isobutyl ketone were charged, and the temperature was raised to 80° C. to dissolve the resin. At the same temperature, 8.5 g of solid potassium hydroxide having a concentration of 95% was added, the temperature was raised to 100° C. with stirring, and the reaction was carried out at the same temperature for 1 hour. After completion of the reaction, the mixture was cooled to 80° C., and 50 g of water was added to dissolve the salts, followed by standing still, by which the lower aqueous phase and the by-product gel were separated and removed. After neutralization using a phosphoric acid solution, the resin solution was washed by using water until the washing solution became neutral, and filtered. Methyl isobutyl ketone was removed under the conditions of 1.33 KPa and 150° C. to obtain an epoxy resin composition (A-16).

As a result of LC analysis, it was confirmed that the Area % of the epoxy resin (1) in the obtained epoxy resin composition (A-16) was 0%.

Comparative Example 12

An epoxy resin composition was synthesized according to the method described in Example 4 of Patent Document 4. Namely, the same operation as in Comparative Example 11 was performed to obtain an epoxy resin composition (A-17), except that the amount of solid potassium hydroxide having a concentration of 95% added was 6.2 g and the reaction temperature was 115° C.

As a result of LC analysis, it was confirmed that the Area % of the epoxy resin (1) in the obtained epoxy resin composition (A-17) was 0%.

Comparative Example 13

An epoxy resin composition was synthesized according to the method described in Comparative Example 3 of Patent Document 4. Namely, the same operation as in Comparative Example 11 was performed to obtain an epoxy resin composition (A-18), except that 12.7 g of sodium hydroxide having a concentration of 49% was changed to solid potassium hydroxide having a concentration of 95% and the reaction was carried out at a reaction temperature of 85° C. for 6 hours.

As a result of LC analysis, it was confirmed that the Area % of the epoxy resin (1) in the obtained epoxy resin composition (A-18) was 0%.

Comparative Example 14

An epoxy resin composition was synthesized according to the method described in Comparative Example 4 of Patent Document 4. Namely, the same operation as in Comparative Example 11 was performed to obtain an epoxy resin composition (A-19), except that the amount of solid potassium hydroxide having a concentration of 95% added was 0.3 g and the reaction time was 3 hours.

As a result of LC analysis, it was confirmed that the Area % of the epoxy resin (1) in the obtained epoxy resin composition (A-19) was 0%.

Comparative Example 15

An epoxy resin composition was synthesized according to the method described in Production Example 1 of Patent Document 5. Namely, into a 3 L separable flask equipped with a stirrer, a thermometer, a condenser, and a water removing device, 121 g of tetramethylbiphenol (manufactured by Mitsubishi Chemical Corporation) and 1850 g of epichlorohydrin were charged, and the contents were heated to 95° C. to dissolve. Subsequently, 79 g of an aqueous 48.5% sodium hydroxide solution was added dropwise over 2 hours. Thereafter, water was separated by azeotropic distillation with epichlorohydrin at 100° C. for 30 minutes, and the reaction was carried out with returning azeotropic epichlorohydrin. After the completion of the reaction, the product was washed by using water to remove a by-product salt and unreacted sodium hydroxide. Next, excess epichlorohydrin was distilled off from the reaction mixture under reduced pressure (5 mmHg) to obtain an epoxy resin composition (A-20).

As a result of LC analysis, it was confirmed that the Area % of the epoxy resin (1) in the obtained epoxy resin composition (A-20) was 0%.

Comparative Example 16

An epoxy resin composition was synthesized according to the method described in Production Example 2 of Patent Document 5. Namely, the same operation as in Comparative Example 15 was performed to obtain an epoxy resin composition (A-21), except that the aqueous 48.5% sodium hydroxide solution was changed from 79 g to 86 g.

As a result of LC analysis, it was confirmed that the Area % of the epoxy resin (1) in the obtained epoxy resin composition (A-21) was 0%.

Comparative Example 17

An epoxy resin composition was synthesized according to the method described in Production Example 3 of Patent Document 5. Namely, the same operation as in Comparative Example 15 was performed to obtain an epoxy resin composition (A-22), except that the 3 L separable flask was changed to a 5 L separable flask, tetramethylbiphenol was changed from 121 g to 726 g, and the aqueous 48.5% sodium hydroxide solution was changed from 79 g to 519 g.

As a result of LC analysis, it was confirmed that the Area % of the epoxy resin (1) in the obtained epoxy resin composition (A-22) was 0%.

Comparative Example 18

An epoxy resin composition was synthesized according to the method described in Production Example 1 of Patent Document 6. Namely, into a four-necked flask having an inner volume of 2 L and equipped with a thermometer, a stirrer, and a cooling tube, 137 g of tetramethylbiphenol (manufactured by Mitsubishi Chemical Corporation), 627 g of epichlorohydrin, 244 g of isopropyl alcohol, and 87 g of water were charged. The contents were uniformly dissolved by raising the temperature to 65° C., and 108 g of an aqueous 48.5% by weight sodium hydroxide solution was then added dropwise over 90 minutes. After completion of the dropping, the temperature was maintained at 65° C. for 30 minutes to complete the reaction, and the reaction solution was transferred to a 3 L separating funnel followed by standing still at 65° C. for 1 hour. Then, the water layer was extracted from the separated oil layer and water layer to remove a by-product salt and excess sodium hydroxide. Subsequently, excess epichlorohydrin and isopropyl alcohol were distilled off from the product under a reduced pressure. After dissolution in 300 g of methyl isobutyl ketone, 4 g of 48.5% by weight of the aqueous sodium hydroxide solution was added, and the contents were reacted again at a temperature of 65° C. for 1 hour. Thereafter, 167 g of methyl isobutyl ketone was added, and then water washing was performed four times by using 500 g of water. Thereafter, the methyl isobutyl ketone was completely removed under reduced pressure at 150° C. to obtain an epoxy resin composition (A-23).

As a result of LC analysis, it was confirmed that the Area % of the epoxy resin (1) in the obtained epoxy resin composition (A-23) was 0%.

Comparative Example 19

An epoxy resin composition was synthesized according to the method described in Example 1 of Patent Document 6. Namely, into a four-necked flask having an inner volume of 2 L and equipped with a thermometer, a stirrer, and a cooling tube, 100 g of the epoxy resin composition (epoxy resin composition (A-23)) obtained in Comparative Example 18, 120 g of methyl isobutyl ketone, and 30 g of dimethyl sulfoxide were charged. The contents were uniformly dissolved by raising the reaction temperature to 65° C., and 9.7 g of 8% by weight of a potassium hydroxide/isopropyl alcohol solution was then added to carry out the reaction for 1 hour. Thereafter, 112 g of methyl isobutyl ketone was added, and then water washing was performed four times by using 200 g of water. Thereafter, the methyl isobutyl ketone was completely removed under reduced pressure at 150° C. to obtain an epoxy resin composition (A-24).

As a result of LC analysis, it was confirmed that the Area % of the epoxy resin (1) in the obtained epoxy resin composition (A-24) was 0%.

Comparative Example 20

An epoxy resin composition was synthesized according to the method described in Example 2 of Patent Document 6. Namely, an epoxy resin composition (A-25) was obtained in the same manner as in Comparative Example 19, except that the amount of 8% by weight of a potassium hydroxide/isopropyl alcohol solution added was 8.7 g and the reaction temperature was changed to 60° C.

As a result of LC analysis, it was confirmed that the Area % of the epoxy resin (1) in the obtained epoxy resin composition (A-25) was 0%.

Comparative Example 21

An epoxy resin composition was synthesized according to the method described in Example 3 of Patent Document 6. Namely, an epoxy resin composition (A-26) was obtained in the same manner as in Comparative Example 19, except that the amount of 8% by weight of a potassium hydroxide/isopropyl alcohol solution added was 10.7 g and the reaction temperature was changed to 80° C.

As a result of LC analysis, it was confirmed that the Area % of the epoxy resin (1) in the obtained epoxy resin composition (A-26) was 1.6%.

Comparative Example 22

An epoxy resin composition was synthesized according to the method described in Example 4 of Patent Document 6. Namely, into a four-necked flask having an inner volume of 2 L and equipped with a thermometer, a stirrer, and a cooling tube, 100 g of the epoxy resin composition (epoxy resin composition (A-23)) obtained in Comparative Example 18, 80 g of methyl isobutyl ketone, and 20 g of dimethyl sulfoxide were charged. The contents were uniformly dissolved by raising the reaction temperature to 65° C., and 2.0 g of 8% by weight of a potassium hydroxide/isopropyl alcohol solution was then added to carry out the reaction for 1 hour. Thereafter, 162 g of methyl isobutyl ketone was added, and then water washing was performed four times by using 200 g of water. Thereafter, the methyl isobutyl ketone was completely removed under reduced pressure at 150° C. to obtain an epoxy resin composition (A-27).

As a result of LC analysis, it was confirmed that the Area % of the epoxy resin (1) in the obtained epoxy resin composition (A-27) was 0%.

Comparative Example 23

An epoxy resin composition was synthesized according to the method described in Comparative Example 2 of Patent Document 6. Namely, an epoxy resin composition (A-28) was obtained in the same manner as in Comparative Example 19, except that the amount of 8% by weight of a potassium hydroxide/isopropyl alcohol solution added was changed to 2.4 g.

As a result of LC analysis, it was confirmed that the Area % of the epoxy resin (1) in the obtained epoxy resin composition (A-28) was 0%.

Comparative Example 24

An epoxy resin composition was synthesized according to the method described in Comparative Example 3 of Patent Document 6. Namely, an epoxy resin composition (A-29) was obtained in the same manner as in Comparative Example 19, except that the amount of 8% by weight of the potassium hydroxide/isopropyl alcohol solution added was 15.0 g and the reaction temperature was changed to 80° C.

As a result of LC analysis, it was confirmed that the Area % of the epoxy resin (1) in the obtained epoxy resin composition (A-29) was 3.1%.

Comparative Example 25

An epoxy resin composition was synthesized according to the method described in Comparative Example 5 of Patent Document 6. Namely, into a four-necked flask having an inner volume of 2 L and equipped with a thermometer, a stirrer, and a cooling tube, 100 g of the epoxy resin composition (epoxy resin composition (A-23)) obtained in Comparative Example 18, 80 g of methyl isobutyl ketone, and 20 g of dimethyl sulfoxide were charged. The contents were uniformly dissolved by raising the reaction temperature to 65° C., and 2.4 g of 48% by weight of an aqueous sodium hydroxide solution was then added to carry out the reaction for 1 hour. Thereafter, 162 g of methyl isobutyl ketone was added, and then water washing was performed four times by using 200 g of water. Thereafter, the methyl isobutyl ketone was completely removed under a reduced pressure at 150° C. to obtain an epoxy resin composition (A-30).

As a result of LC analysis, it was confirmed that the Area % of the epoxy resin (1) in the obtained epoxy resin composition (A-30) was 0%.

The following quality evaluations were performed on the epoxy resin compositions (A-1) to (A-30) obtained in Examples 1 to 5 and Comparative Examples 1 to 25. The results are shown in Tables 1 to 4.

Epoxy Equivalent
LC analysis (each Area % at UV=280 nm of LC chart represented by epoxy resin (1), epoxy resin (2) (epoxy resin (2-0), epoxy resin (2-1), and epoxy resin (2-2)), and other components)
Shape after being at 15° C. for 24 hours (the shape after extracting the resin into an aluminum dish at 150° C. and leave it in a refrigerator at 15° C. for 24 hours)
Melting temperature (the temperature at which melting occurs when the temperature is raised at 1° C./min by using a Yanagimoto melting point measuring device. "–" indicates that the sample was not crystallized and could not be measured due to the liquid state)
Handleability (those having a shape after being at 15° C. for 24 hours of solid and having a melting temperature of 100° C. or lower were evaluated as A, otherwise evaluated as B)

TABLE 1

| | | | Example 1 | Example 2 | Example 3 | Example 4 | Example 5 | Comparative Example 1 | Comparative Example 2 | Comparative Example 3 |
|---|---|---|---|---|---|---|---|---|---|---|
| | Epoxy resin composition | | A-1 | A-2 | A-3 | A-4 | A-5 | A-6 | A-7 | A-8 |
| | Epoxy equivalent | g/eq | 236 | 220 | 231 | 199 | 191 | 321 | 240 | 190 |
| LC | Epoxy resin (1) | % | 0.9 | 0.1 | 0.5 | 0.7 | 0.3 | 5 | 1.1 | 0 |
| analysis | Epoxy resin (2-0) | % | 51.9 | 62.9 | 55.2 | 80.3 | 87.9 | 13.5 | 49.1 | 89.1 |
| | Epoxy resin (2-1) | % | 37.4 | 29.7 | 35.2 | 14.8 | 8.9 | 58.8 | 39.3 | 8.1 |
| | Epoxy resin (2-2) | % | 7.1 | 4.7 | 6.3 | 1.4 | 0.2 | 20.2 | 7.6 | 0 |
| | Other component | % | 2.7 | 2.6 | 2.8 | 2.8 | 2.7 | 2.5 | 2.9 | 2.8 |
| | Shape after 24 hours at 15° C. | — | Solid | Solid | Solid | Solid | Solid | Liquid | Liquid | Solid |
| | Melting temperature | ° C. | 78 | 85 | 82 | 90 | 98 | — | — | 105 |
| | Handleability | — | A | A | A | A | A | B | B | B |

TABLE 2

|  |  | Comparative Example 4 | Comparative Example 5 | Comparative Example 6 | Comparative Example 7 | Comparative Example 8 | Comparative Example 9 | Comparative Example 10 | Comparative Example 11 |
|---|---|---|---|---|---|---|---|---|---|
| Epoxy resin composition |  | A-9 | A-10 | A-11 | A-12 | A-13 | A-14 | A-15 | A-16 |
| Epoxy equivalent | g/eq | 203 | 184 | 182 | 188 | 190 | 199 | 197 | 193 |
| LC analysis | Epoxy resin (1) | % | 0 | 0 | 0 | 0 | 0 | 0 | 0 | 0 |
|  | Epoxy resin (2-0) | % | 74.8 | 94.2 | 95.6 | 88.2 | 87.5 | 79.1 | 84.3 | 86.5 |
|  | Epoxy resin (2-1) | % | 15.3 | 3.6 | 1.8 | 7.8 | 8.9 | 11.8 | 8.7 | 9.3 |
|  | Epoxy resin (2-2) | % | 7.4 | 0 | 0 | 1.1 | 1 | 6.3 | 4 | 1.6 |
|  | Other component | % | 2.5 | 2.2 | 2.6 | 2.9 | 2.6 | 2.8 | 3 | 2.6 |
| Shape after 24 hours at 15° C. | — | Solid | Solid | Solid | Solid | Solid | Solid | Solid | Solid |
| Melting temperature | ° C. | 93 | 104 | 106 | 105 | 105 | 95 | 97 | 102 |
| Handleability | — | A | B | B | B | B | A | A | B |

TABLE 3

|  |  | Comparative Example 12 | Comparative Example 13 | Comparative Example 14 | Comparative Example 15 | Comparative Example 16 | Comparative Example 17 | Comparative Example 18 | Comparative Example 19 |
|---|---|---|---|---|---|---|---|---|---|
| Epoxy resin composition |  | A-17 | A-18 | A-19 | A-20 | A-21 | A-22 | A-23 | A-24 |
| Epoxy equivalent | g/eq | 190 | 190 | 188 | 220 | 201 | 230 | 185 | 209 |
| LC analysis | Epoxy resin (1) | % | 0 | 0 | 0 | 0 | 0 | 0 | 0 | 0 |
|  | Epoxy resin (2-0) | % | 87.7 | 87.3 | 88.5 | 63.2 | 78.3 | 59.8 | 93 | 70.3 |
|  | Epoxy resin (2-1) | % | 8.6 | 8.8 | 7.5 | 28.7 | 12.1 | 29.8 | 4.5 | 20.2 |
|  | Epoxy resin (2-2) | % | 1.1 | 1.3 | 1.4 | 5.4 | 7 | 7.6 | 0 | 7 |
|  | Other component | % | 2.6 | 2.6 | 2.6 | 2.7 | 2.6 | 2.8 | 2.5 | 2.5 |
| Shape after 24 hours at 15° C. | — | Solid | Solid | Solid | Solid | Solid | Solid | Solid | Solid |
| Melting temperature | ° C. | 105 | 105 | 105 | 90 | 94 | 85 | 104 | 92 |
| Handleability | — | B | B | B | A | A | A | B | A |

TABLE 4

|  |  | Comparative Example 20 | Comparative Example 21 | Comparative Example 22 | Comparative Example 23 | Comparative Example 24 | Comparative Example 25 |
|---|---|---|---|---|---|---|---|
| Epoxy resin composition |  | A-25 | A-26 | A-27 | A-28 | A-29 | A-30 |
| Epoxy equivalent | g/eq | 200 | 255 | 198 | 194 | 280 | 198 |
| LC analysis | Epoxy resin (1) | % | 0 | 1.6 | 0 | 0 | 3.1 | 0 |
|  | Epoxy resin (2-0) | % | 78.8 | 46.9 | 81.2 | 85.3 | 34.7 | 82.5 |
|  | Epoxy resin (2-1) | % | 11.5 | 41.1 | 10.3 | 10.1 | 33.9 | 9.9 |
|  | Epoxy resin (2-2) | % | 7.1 | 7.7 | 5.7 | 2 | 25.4 | 5.1 |
|  | Other component | % | 2.6 | 2.7 | 2.8 | 2.6 | 2.9 | 2.5 |
| Shape after 24 hours at 15° C. | — | Solid | Liquid | Solid | Solid | Liquid | Solid |
| Melting temperature | ° C. | 95 | — | 96 | 102 | — | 97 |
| Handleability | — | A | B | A | B | B | A |

[Production of Epoxy Resin Composition (B) and Evaluation on Cured Product]

Examples 6 to 10 and Comparative Examples 26 to 50

<Measurement of Gel Time at 100° C.>

The time to being a gel on a hot plate heated to 100° C. was measured on epoxy resin compositions (B-1) to (B-30) obtained by blending the epoxy resin compositions (A-1) to (A-30) and a curing agent (ethyl methyl imidazole, EMI-24 manufactured by Mitsubishi Chemical Corporation) at the ratios shown in Tables 5 to 8. The results are shown in Tables 5 to 8. In Table 2, "parts" represents "parts by weight". Additionally, "–" in the gel time at 100° C. indicates that although the sample was heated to 100° C., it could not be tested because of not melting.

<Measurement of Glass Transition Temperature (Tg (E"))>

Two glass plates on which a PET release film was laminated on one surface were prepared, and these glass plates were adjusted such that the release pet film side was an inner surface and the glass plate interval was 4 mm, so as to prepare a casting plate. Into the casting plate, the epoxy resin compositions (B-1) to (B-30) obtained by blending the epoxy resin compositions (A-1) to (A-30) and the curing agent (ethyl methyl imidazole, EMI-24 manufactured by Mitsubishi Chemical Corporation) at the ratios shown in Tables 5 to 8 were casted, and were cured by heating at 120° C. for 2 hours and then at 175° C. for 6 hours to obtain cured products.

The obtained cured product was cut into a length of 5 cm, a width of 1 cm, and a thickness of 4 mm to obtain a test piece.

Using a thermomechanical analyzer (DMS: EXSTAR6100 manufactured by Seiko Instruments Inc.), analysis was performed in a three-point bending mode by the following measurement method, and the peak top of E" of 1 Hz was defined as Tg (E"). The results are shown in Tables 5 to 8. In Tables 5 to 8, "–" in Tg (E") indicates that the glass transition temperature could not be measured because solidification was not possible.

(Measurement Method)

First temperature raising: 5° C./min, 30° C. to 250° C.

TABLE 5

| | | | Example 6 | Example 7 | Example 8 | Example 9 | Example 10 | Comparative Example 26 | Comparative Example 27 | Comparative Example 28 |
|---|---|---|---|---|---|---|---|---|---|---|
| | Epoxy resin composition | | B-1 | B-2 | B-3 | B-4 | B-5 | B-6 | B-7 | B-8 |
| Blending of epoxy resin composition | Epoxy resin composition (A-1) | Part | 100 | | | | | | | |
| | Epoxy resin composition (A-2) | Part | | 100 | | | | | | |
| | Epoxy resin composition (A-3) | Part | | | 100 | | | | | |
| | Epoxy resin composition (A-4) | Part | | | | 100 | | | | |
| | Epoxy resin composition (A-5) | Part | | | | | 100 | | | |
| | Epoxy resin composition (A-6) | Part | | | | | | 100 | | |
| | Epoxy resin composition (A-7) | Part | | | | | | | 100 | |
| | Epoxy resin composition (A-8) | Part | | | | | | | | 100 |
| | Curing agent | Part | 1 | 1 | 1 | 1 | 1 | 1 | 1 | 1 |
| | Gel time at 100° C. | s | 97 | 93 | 95 | 80 | 83 | >100 | >100 | — |
| | Tg (E") | ° C. | 150 | 154 | 152 | 158 | 160 | 130 | 148 | — |

TABLE 6

| | | | Comparative Example 29 | Comparative Example 30 | Comparative Example 31 | Comparative Example 32 | Comparative Example 33 | Comparative Example 34 | Comparative Example 35 | Comparative Example 36 |
|---|---|---|---|---|---|---|---|---|---|---|
| | Epoxy resin composition | | B-9 | B-10 | B-11 | B-12 | B-13 | B-14 | B-15 | B-16 |
| Blending of epoxy resin composition | Epoxy resin composition (A-9) | Part | 100 | | | | | | | |
| | Epoxy resin composition (A-10) | Part | | 100 | | | | | | |
| | Epoxy resin composition (A-11) | Part | | | 100 | | | | | |
| | Epoxy resin composition (A-12) | Part | | | | 100 | | | | |
| | Epoxy resin composition (A-13) | Part | | | | | 100 | | | |
| | Epoxy resin composition (A-14) | Part | | | | | | 100 | | |
| | Epoxy resin composition (A-15) | Part | | | | | | | 100 | |
| | Epoxy resin composition (A-16) | Part | | | | | | | | 100 |
| | Curing agent | Part | 1 | 1 | 1 | 1 | 1 | 1 | 1 | 1 |
| | Gel time at 100° C. | s | >100 | — | — | — | — | 99 | 98 | — |
| | Tg (E") | ° C. | 142 | — | — | — | — | 146 | 149 | — |

TABLE 7

| | | | Comparative Example 37 | Comparative Example 38 | Comparative Example 39 | Comparative Example 40 | Comparative Example 41 | Comparative Example 42 | Comparative Example 43 | Comparative Example 44 |
|---|---|---|---|---|---|---|---|---|---|---|
| | Epoxy resin composition | | B-17 | B-18 | B-19 | B-20 | B-21 | B-22 | B-23 | B-24 |
| Blending of epoxy resin composition | Epoxy resin composition (A-17) | Part | 100 | | | | | | | |
| | Epoxy resin composition (A-18) | Part | | 100 | | | | | | |
| | Epoxy resin composition (A-19) | Part | | | 100 | | | | | |
| | Epoxy resin composition (A-20) | Part | | | | 100 | | | | |
| | Epoxy resin composition (A-21) | Part | | | | | 100 | | | |
| | Epoxy resin composition (A-22) | Part | | | | | | 100 | | |
| | Epoxy resin composition (A-23) | Part | | | | | | | 100 | |
| | Epoxy resin composition (A-24) | Part | | | | | | | | 100 |
| | Curing agent | Part | 1 | 1 | 1 | 1 | 1 | 1 | 1 | 1 |
| Gel time at 100° C. | | s | — | — | — | >100 | >100 | >100 | — | >100 |
| Tg (E″) | | ° C. | — | — | — | 136 | 145 | 126 | — | 141 |

TABLE 8

| | | | Comparative Example 45 | Comparative Example 46 | Comparative Example 47 | Comparative Example 48 | Comparative Example 49 | Comparative Example 50 |
|---|---|---|---|---|---|---|---|---|
| | Epoxy resin composition | | B-25 | B-26 | B-27 | B-28 | B-29 | B-30 |
| Blending of epoxy resin composition | Epoxy resin composition (A-25) | Part | 100 | | | | | |
| | Epoxy resin composition (A-26) | Part | | 100 | | | | |
| | Epoxy resin composition (A-27) | Part | | | 100 | | | |
| | Epoxy resin composition (A-28) | Part | | | | 100 | | |
| | Epoxy resin composition (A-29) | Part | | | | | 100 | |
| | Epoxy resin composition (A-30) | Part | | | | | | 100 |
| | Curing agent | Part | 1 | 1 | 1 | 1 | 1 | 1 |
| Gel time at 100° C. | | s | >100 | >100 | 99 | — | >100 | 98 |
| Tg (E″) | | ° C. | 145 | 145 | 146 | — | 139 | 148 |

EVALUATION OF RESULTS

According to the results of Examples 6 to 10 and Comparative Examples 26 to 50, it is understood that the epoxy resin compositions (B-1) to (B-5) using the epoxy resin compositions (A-1) to (A-5) of Examples 1 to 5 are more excellent in curability than the epoxy resin compositions (B-6) to (B-30) using the epoxy resin compositions (A-6) to (A-30) of Comparative Examples 1 to 25.

From these results, it is understood that since the epoxy resin (2) has a linear structure, the influence on the gel time is small, while since the epoxy resin (1) has a radiation structure, it has a good effect on curing characteristics. Further, as a result, it is understood that the obtained cured product has a high glass transition temperature and excellent heat resistance.

Although the present invention has been described in detail with reference to the specific embodiment, it will be apparent to those skilled in the art that various changes and modifications can be made without departing from the spirit and scope of the present invention. The present application is based on a Japanese Patent Application (Japanese Patent Application No. 2017-237870) filed on Dec. 12, 2017, contents of which are incorporated herein by reference.

The invention claimed is:
1. An epoxy resin composition (A), comprising
an epoxy resin represented by the following formula (1):

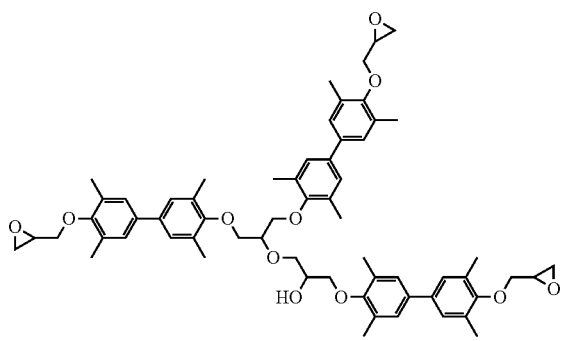

and
an epoxy resin represented by the following formula (2):

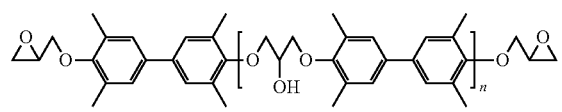

wherein in formula (2), n represents an integer of from 0 to 2,
wherein a content of the epoxy resin represented by formula (1) is from 0.01 to 0.99% by weight.

2. The epoxy resin composition (A) according to claim 1, wherein among the epoxy resin represented by formula (2),
an epoxy resin in which n=0 is contained in an amount of from 49.2 to 89.0% by weight,
an epoxy resin in which n=1 is contained in an amount of from 8.2 to 39.2% by weight, and
an epoxy resin in which n=2 is contained in an amount of from 0.1 to 7.5% by weight.

3. The epoxy resin composition (A) according to claim 2, wherein among the epoxy resin represented by formula (2),
the epoxy resin in which n=0 is contained in an amount of from 51.9 to 87.9% by weight,
the epoxy resin in which n=1 is contained in an amount of from 8.9 to 37.4% by weight, and
the epoxy resin in which n=2 is contained in an amount of from 0.2 to 7.1% by weight.

4. An epoxy resin composition (B), comprising a curing agent in an amount of from 0.01 to 1000 parts by weight relative to 100 parts by weight of the epoxy resin composition (A) according to claim 1.

5. An epoxy resin composition (B), comprising a curing agent in an amount of from 0.01 to 1000 parts by weight relative to 100 parts by weight of the epoxy resin composition (A) according to claim 2.

6. An epoxy resin composition (B), comprising a curing agent in an amount of from 0.01 to 1000 parts by weight relative to 100 parts by weight of the epoxy resin composition (A) according to claim 3.

7. The epoxy resin composition (B) according to claim 4, wherein the curing agent is at least one selected from the group consisting of a phenolic curing agent, an amine curing agent, an acid anhydride curing agent, and an amide curing agent.

8. The epoxy resin composition (B) according to claim 5, wherein the curing agent is at least one selected from the group consisting of a phenolic curing agent, an amine curing agent, an acid anhydride curing agent, and an amide curing agent.

9. The epoxy resin composition (B) according to claim 6, wherein the curing agent is at least one selected from the group consisting of a phenolic curing agent, an amine curing agent, an acid anhydride curing agent, and an amide curing agent.

10. The epoxy resin composition (B) according to claim 4, further comprising an epoxy resin which is different from the epoxy resin in the epoxy resin composition (A).

11. The epoxy resin composition (B) according to claim 7, further comprising an epoxy resin which is different from the epoxy resin in the epoxy resin composition (A).

12. A cured product obtained by curing the epoxy resin composition (B) according to claim 4.

13. A cured product obtained by curing the epoxy resin composition (B) according to claim 7.

14. A cured product obtained by curing the epoxy resin composition (B) according to claim 10.

15. An electrical or electronic component obtained by curing the epoxy resin composition (B) according to claim 4.

16. An electrical or electronic component obtained by curing the epoxy resin composition (B) according to claim 7.

17. An electrical or electronic component obtained by curing the epoxy resin composition (B) according to claim 10.

* * * * *